United States Patent
Wee

(10) Patent No.: US 11,396,350 B2
(45) Date of Patent: *Jul. 26, 2022

(54) WATER AND LAND-BASED MODULAR SYSTEM FOR ENVIRONMENTALLY VERSATILE HOUSING, SHELTER AND COMMERCIAL USE

(71) Applicant: Charles I. Wee, Glendale, CA (US)

(72) Inventor: Charles I. Wee, Glendale, CA (US)

(*) Notice: Subject to any disclaimer, the term of this patent is extended or adjusted under 35 U.S.C. 154(b) by 103 days.

This patent is subject to a terminal disclaimer.

(21) Appl. No.: 16/671,040

(22) Filed: Oct. 31, 2019

(65) Prior Publication Data

US 2020/0062346 A1 Feb. 27, 2020

Related U.S. Application Data

(63) Continuation of application No. 15/426,981, filed on Feb. 7, 2017, now Pat. No. 10,464,636, which is a
(Continued)

(51) Int. Cl.
*B63B 35/44* (2006.01)
*B63B 35/38* (2006.01)
(Continued)

(52) U.S. Cl.
CPC ............. *B63B 35/44* (2013.01); *B63B 3/08* (2013.01); *B63B 17/02* (2013.01); *B63B 29/025* (2013.01);
(Continued)

(58) Field of Classification Search
CPC .... B63B 3/02; B63B 3/04; B63B 3/06; B63B 3/08; B63B 17/02; B63B 21/50; B63B 29/025; B63B 35/38; B63B 35/44; B63B 2035/4426; B63B 2035/4453; Y02A 10/30; Y02A 30/00; Y02A 50/00; E04B 1/343; E04B 1/34315; E04B 1/34321; E04B 1/34326; E04B 1/34331; E04B 1/34357; E04B 1/34384; E04B 2001/34389;
(Continued)

(56) References Cited

U.S. PATENT DOCUMENTS 2,336,435 A * 12/1943 Zirinsky ............. E04B 1/34315
52/236.7
RE25,827 E * 8/1965 Bigelow, Jr. ........ E04B 1/34336
206/386
(Continued)

FOREIGN PATENT DOCUMENTS

CN 201850650 U 6/2011
FR 2621004 A1 3/1989
(Continued)

*Primary Examiner* — Ajay Vasudeva
(74) *Attorney, Agent, or Firm* — Intellectual Property Law Group LLP

(57) ABSTRACT

A sustainable floating and land application community based on a mass-produced modular, pre-fabricated kit of parts referred to as floating modular units (FMU) or land module units (LMU). Both modular units are designed to allow for various needs while remaining simple to deliver and assemble by hand in remote destinations prone to volatile shifts in water levels and currents. Both floating and land module units can be erected for use on land and bodies of water.

20 Claims, 29 Drawing Sheets

Related U.S. Application Data continuation-in-part of application No. 15/046,382, filed on Feb. 17, 2016, now Pat. No. 10,179,630.

(51) Int. Cl.

| | | |
|---|---|---|
| *B63B 17/02* | (2006.01) | |
| *B63B 29/02* | (2006.01) | |
| *E04H 9/14* | (2006.01) | |
| *B63B 3/08* | (2006.01) | |
| *E04B 1/348* | (2006.01) | |
| *E04H 1/00* | (2006.01) | |
| *E04H 1/12* | (2006.01) | |
| *E04H 15/00* | (2006.01) | |
| *B63B 21/50* | (2006.01) | |

(52) U.S. Cl.
CPC .......... *B63B 35/38* (2013.01); *E04B 1/34861* (2013.01); *E04H 1/005* (2013.01); *E04H 1/12* (2013.01); *E04H 1/1205* (2013.01); *E04H 9/145* (2013.01); *E04H 15/008* (2013.01); *B63B 21/50* (2013.01); *B63B 2035/4426* (2013.01); *E04B 2001/34884* (2013.01); *Y02A 10/30* (2018.01); *Y02A 30/00* (2018.01); *Y02A 50/00* (2018.01)

(58) Field of Classification Search
CPC ....... E04B 1/34861; E04B 2001/34884; E04H 1/005; E04H 1/12; E04H 1/1205; E04H 9/145; E04H 15/008; E04D 13/00
See application file for complete search history.

(56) References Cited

U.S. PATENT DOCUMENTS

| | | | |
|---|---|---|---|
| 3,517,962 A | 6/1970 | Bassett | |
| 3,581,692 A | 6/1971 | Mortellito | |
| D222,129 S | 10/1971 | Baker | |
| 3,690,077 A * | 9/1972 | Dalgliesh, Jr. | ...... E04B 1/34846 52/79.8 |
| 3,697,098 A | 10/1972 | Fisher | |
| 3,707,811 A * | 1/1973 | Hampson | .................. E04B 1/10 52/23 |
| 3,785,314 A | 1/1974 | Scanlan | |
| 3,791,080 A | 2/1974 | Sjoberg | |
| 3,838,545 A * | 10/1974 | Kump | ................. E04B 1/34815 52/79.8 |
| 3,984,953 A * | 10/1976 | Kump | ................. E04B 1/34321 52/143 |
| 4,228,788 A | 10/1980 | Moeser | |
| 4,637,179 A * | 1/1987 | Bigelow, Jr. | ........ E04B 1/34321 52/125.2 |
| 5,421,282 A | 6/1995 | Morris | |
| 5,535,696 A | 7/1996 | Ordinachev | |
| 6,773,355 B1 | 8/2004 | Lekhtman | |
| 7,036,449 B2 | 5/2006 | Sutter | |
| 7,775,896 B2 | 8/2010 | Henry et al. | |
| 9,523,208 B2 * | 12/2016 | Athanasiou | ............... E04H 1/12 |
| 10,179,630 B2 * | 1/2019 | Wee | ....................... B63B 35/38 |
| 10,464,636 B2 * | 11/2019 | Wee | ....................... E04H 9/145 |
| 10,654,546 B2 * | 5/2020 | Wee | ...................... B63B 29/025 |
| 2006/0272240 A1 | 12/2006 | Papageorgiou | |
| 2014/0047781 A1 | 2/2014 | Miller | |

FOREIGN PATENT DOCUMENTS

| | | |
|---|---|---|
| JP | H 02200595 A | 8/1990 |
| KR | 2013096084 A | 1/2014 |
| WO | WO 02055376 A2 | 7/2002 |
| WO | WO 2005012073 A1 | 2/2005 |
| WO | WO 2015008231 A2 | 1/2015 |

* cited by examiner

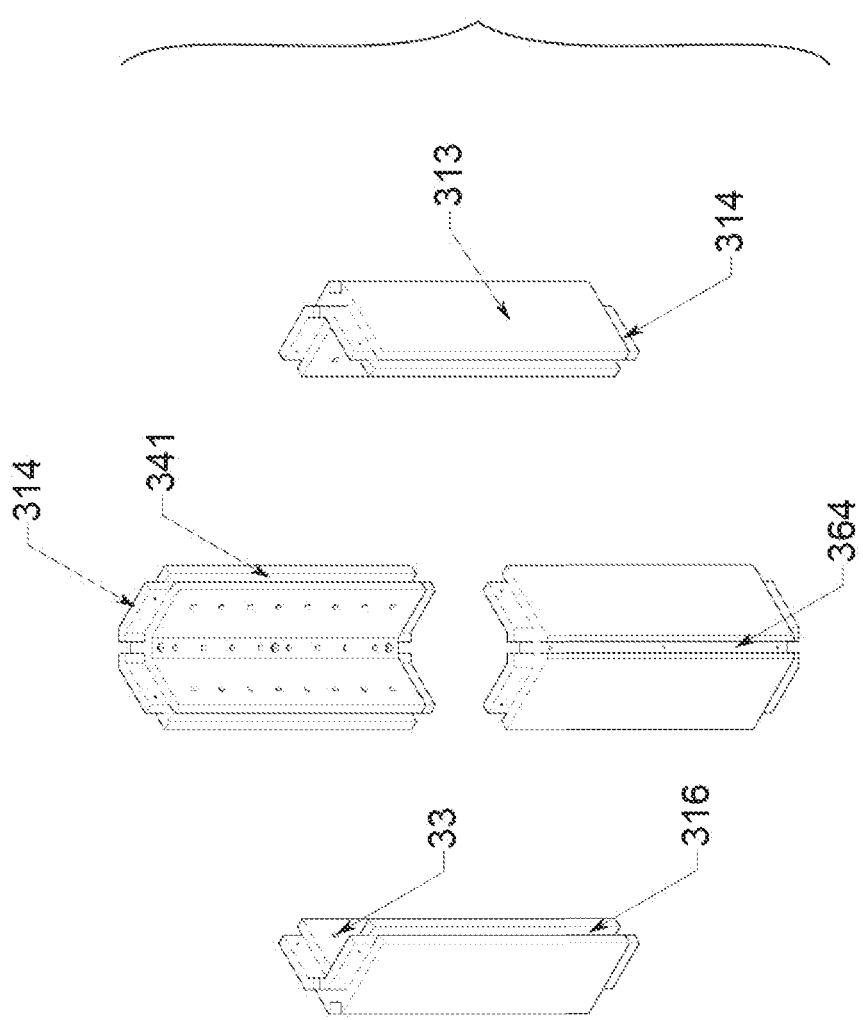

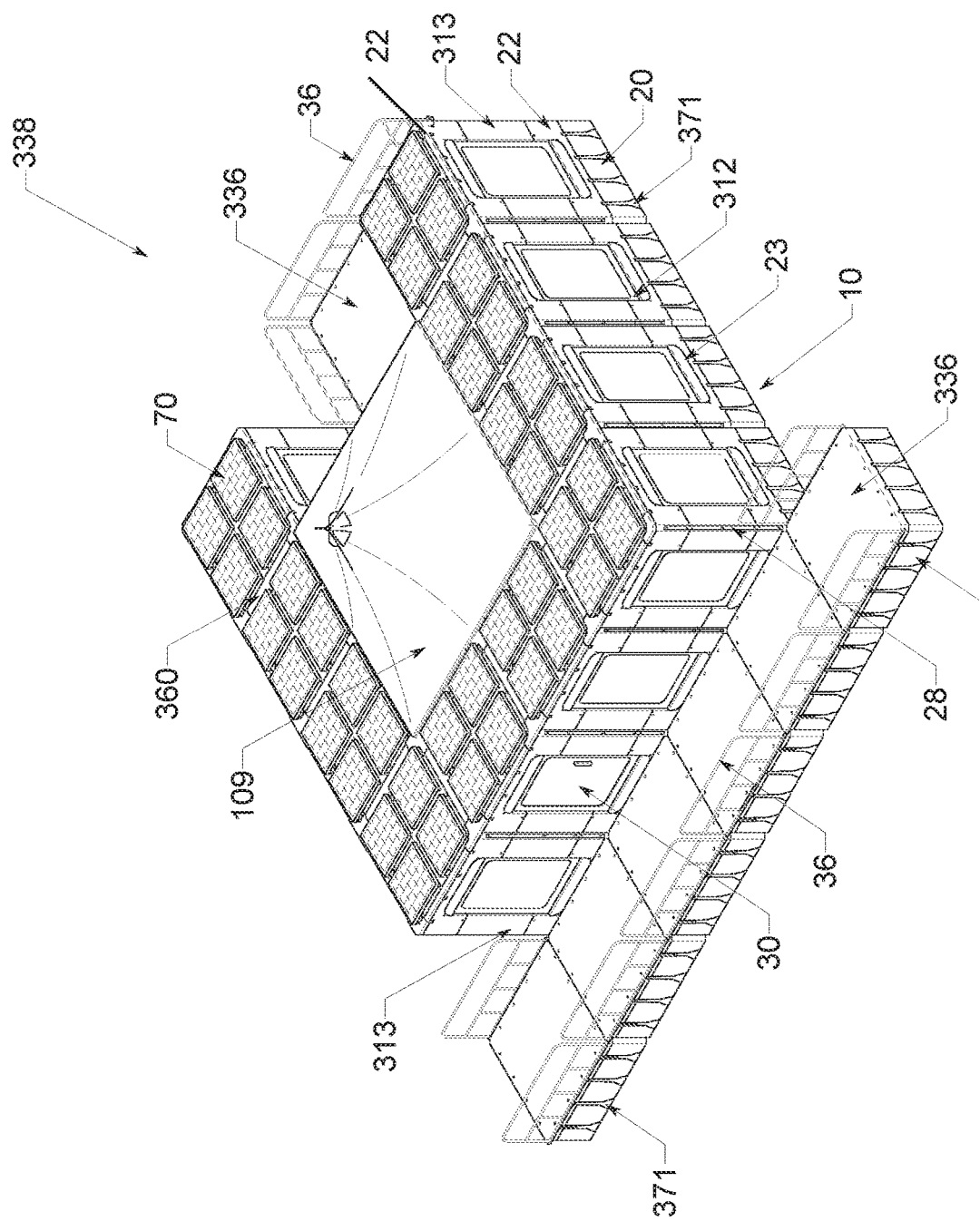

WATER AND LAND-BASED MODULAR SYSTEM FOR ENVIRONMENTALLY VERSATILE HOUSING, SHELTER AND COMMERCIAL USE

CROSS-REFERENCE TO RELATED APPLICATION

This application is a continuation of commonly owned U.S. application Ser. No. 15/426,981, filed Feb. 7, 2017 now U.S. Pat. No. 10,464,636, which is a continuation-in-part of U.S. application Ser. No. 15/046,382, filed Feb. 17, 2016 now U.S. Pat. No. 10,179,630; each of which is hereby incorporated by reference in its entirety for all purposes.

BACKGROUND OF THE INVENTION

1. Field of the Invention

The present invention relates to communities. More particularly, the present Invention relates to communities produced from modular, pre-fabricated kits that are easily delivered and assembled and designed for a variety of configurations for water and land.

2. Background

Communities around the world in remote or non-remote locations, live in areas adversely affected by volatile changes in water levels prone to seasonal or frequent flooding as a result of unpredictable extreme water level fluctuations. People living along rivers are faced with having to reside above water for at least eight months out of the year. With only 4 months of dry season with exposed ground, opportunities to raise animals for sustenance are very limited causing cycles of poverty. With frequent flooding, water levels may rise or recede up to 30 feet in the span of a few days. Existing local construction materials and construction technology is very limited increasing time spent making continuous repairs and rebuilding.

There also remains a global crisis with respect to urban slums, homelessness and refugee camps having inadequate access to semi-permanent housing/shelter with life sustaining amenities that could greatly enhance their life and transition to permanent housing and essential services. These communities currently lack adequate electrical power, sanitation and clean drinking water which adversely affects the population and insures the communities' continual battle with poverty. These existing conditions demonstrate an overwhelming lack of suitable materials and technology to provide long-term protection, safety, comfort and means of becoming economically self-sufficient.

As such, there is a need for a self-contained modular system which can be arranged in a variety of configurations that is easily deliverable and assembled. These modular systems allow people from these communities to have access to a sustainable lifestyle by meeting the various living, working, playing programs that their livelihood depends on when living on or directly adjacent to the water. By creating sustainable communities capable of floating on water or being erected directly on land where public utilities are not available and allowing users to have safe housing, the ability to farm, grow livestock, educate, conduct commerce, provide medical procedures and many other life-essential uses, the self-contained, floating modular system is directed toward providing such a technique to insure a more adequate lifestyle and means to accomplish a better way of life. The durable and flexible nature of the invention allows the invention to function on both water and land to best meet the fluctuating water levels and other local site conditions with relative ease.

SUMMARY

According to the embodiments of the present invention there is a transportable structure kit for use in assembling at least one level of communities for land or water, comprising a plurality of exterior container shells, a plurality of panel sections and a plurality of column members configured to form an enclosed transportation mode configuration and assembled into at least one shelter mode configuration. Each shell of the plurality of exterior container shell, comprises a top portion, a middle portion and a bottom portion. In the enclosed transportation mode configuration, a plurality of panel sections and a plurality of column members are adapted to be stored within. There is a plurality of column members that can adjoin the top surface of the bottom portion with a bottom surface of the middle portion and a plurality of column members that can adjoin the middle portion with the top portion to form one shelter mode configuration. A plurality of panel sections and the plurality of column members can be adapted to assemble into one shelter mode configuration.

According to another embodiment of the present invention, there is a transportable structure kit for use in assembling at least one level of communities for land or water further comprising at least one base removeably attached to a bottom surface of the shelter mode configuration.

According to yet another embodiment of the present invention, there is a method of assembling a shelter structure community for land or water from a transportable structure kit, the kit comprising: a top portion, a middle portion, a bottom portion, a plurality of column members, and at least four panels. The method, according to an embodiment, comprises connecting a bottom surface of the middle portion to a top surface of the bottom portion and connecting at least one end of a column member to a top surface of the middle portion and at the other end to a bottom surface of a top portion.

According to yet another embodiment of the present invention, there is at least one shelter mode configuration that can be stacked on top of another shelter mode configuration and removably connected by fasteners, according to an embodiment of the present invention.

According to yet another embodiment of the present invention, there is at least one shelter mode configuration that can be connected to an adjacent shelter mode configuration, whether stacked or not stacked, according to an embodiment of the present invention.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

FIG. 11 is a perspective view of four columns, according to an embodiment of the present invention.

FIG. 23 is a perspective view of ten enclosed FMU's surrounding a waterproof tensile fabric canopy conjoined to create a larger waterproof assembly area, according to an embodiment of the present invention.

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only. All of the components in the present invention can be disassembled.

The single floating module unit (FMU) 10 and the land module unit 500 can both be referred to as an enclosed shelter mode configuration. A packed FMU 18 can be referred to as an enclosed transportation mode configuration and a transportable structure kit. A single FMU 10 and land module unit 500 can be modified to have open sidewalls or it can be open to the sky and in this configuration, both can be referred to as a shelter mode configuration. The connections in the present invention are not permanent and can be removed when needed.

Figure 1:
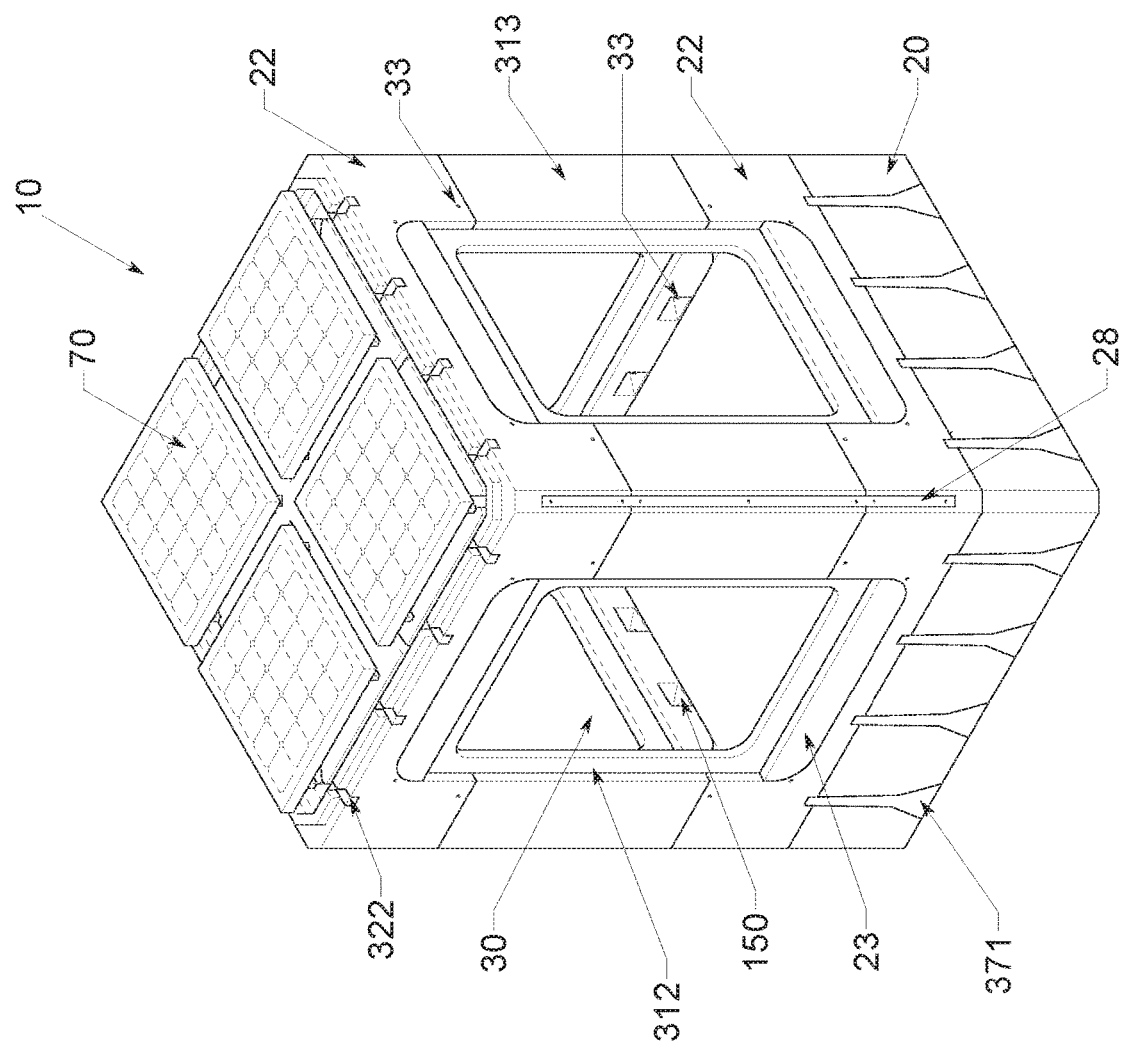
FIG. 1 is a perspective view of a fully assembled single Floating Module Unit (FMU), according to an embodiment of the present invention.

FIG. 1 is a perspective view of a fully assembled single story, single Floating Module Unit (FMU) 10, according to an embodiment of the present invention. A single FMU 10 can function as a single floating enclosed space, or it can be modified to have open sidewalls or it can be open to the sky. It may be attached to other FMU 10 with or without waterproof tensile fabric canopies 10 (not shown, see FIG. 23) to allow for larger enclosed areas. The FMU 10 derives its flotation from the lower hull 20 and the material attributes as a result of the component being fabricated from rotational molded high density polyethylene resin with molded air cavity and injected high density polyurethane foam.

Figure 3:
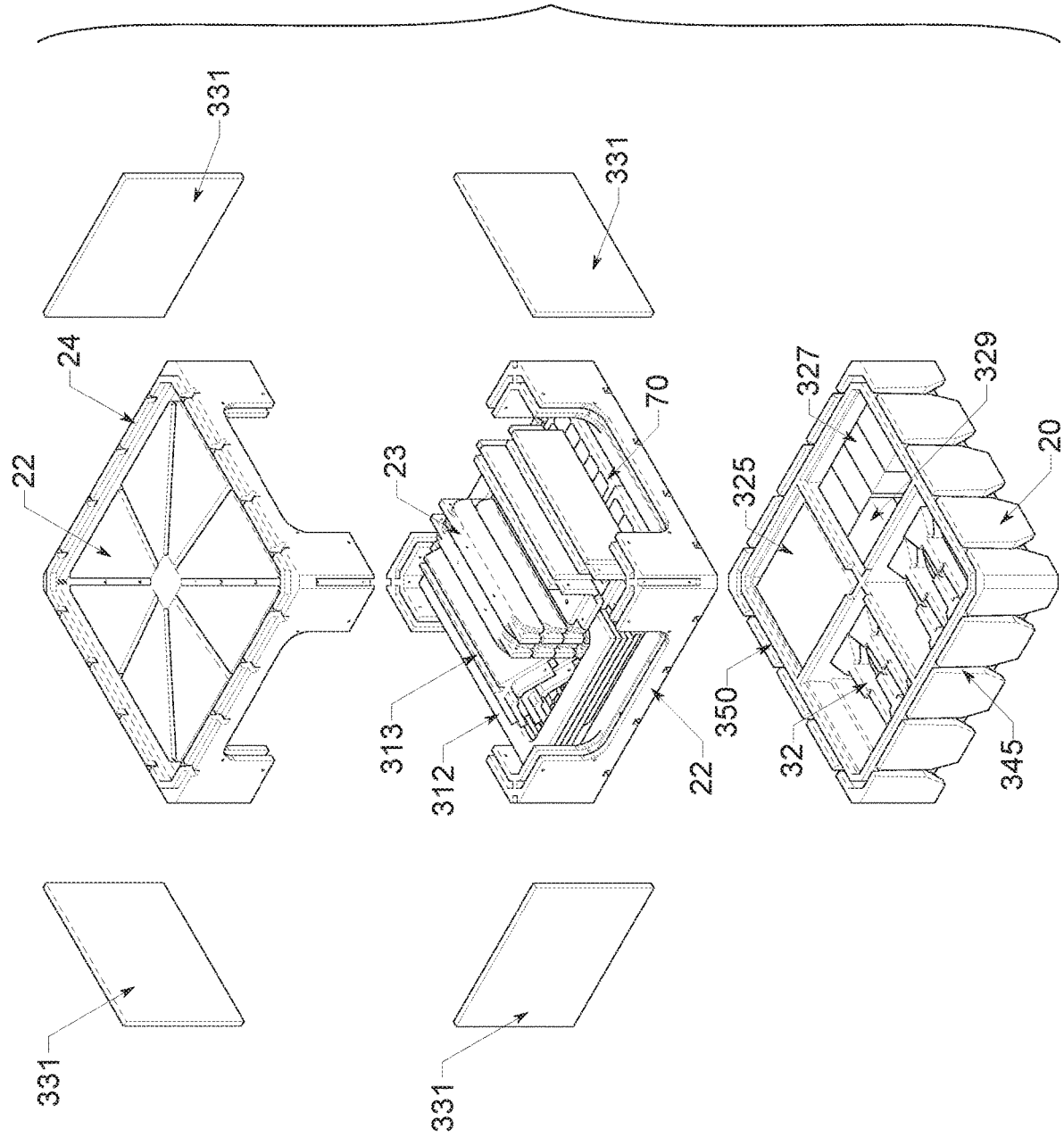
FIG. 3 is an exploded view of a packed FMU having a kit of components, according to an embodiment of the present invention.

An interchangeable deck and roof assembly 22, snaps into place atop of the lower hull 20 by means of a deck and roof insert 24 (not shown, see FIG. 3) molded into the interchangeable roof and deck assembly 22 being inserted into the hull deck recess 350 (not shown, see FIG. 3). To securely fasten the lower interchangeable deck and roof assembly 22 to the lower hull 20, bolts will be inserted into the bolt cavity 150 and fastened into the threaded inserts molded into interchangeable deck and roof assembly 22 and connect into the threaded bolt hole insert 33 located at the top of either a joint type hull connector 32 or end type hull connector 371. A lower interchangeable sill 23 with the sill insert 25 (not shown, see FIG. 13) is placed into a bulkhead insert recess 341 (not shown, see FIG. 15). To securely fasten the lower interchangeable sill 23 to the lower hull 20, stainless steel bolt, washer and nut assembly 301 (not shown, see FIG. 4) will be inserted into the bolt cavity 150 and fastened into the threaded bolt hole inserts 33 molded into the lower hull 20.

The FMU roof 22 is supported by four corner columns 313 that have upper and lower column inserts 314 (not shown, see FIG. 11) that lock into the column insert recess 342 (not shown, see FIG. 6) of the interchangeable deck and roof assembly 22. A bulkhead frame 312 and attached door/window panel assembly 30 slides into the column recess 316 (not shown, see FIG. 11) and sill recess 344 (not shown, see FIG. 13) similar to a tongue and groove connection. An upper interchangeable sill 23 is rotated 180 degrees from the configuration of the lower interchangeable sill 23 and placed atop the bulkhead frame 312. An upper interchangeable deck and roof assembly 22 is rotated 180 degrees from the lower interchangeable deck and roof assembly 22 of the FMU 10 and placed on top of the upper interchangeable sill 23 and four columns 313 acting as a roof. The lower hull 20, lower interchangeable deck and roof assembly 22 and upper interchangeable deck and roof assembly 22 (acting as a roof) together form a single story FMU 10. The upper column inserts 314 (not shown, see FIG. 11) and upper sill inserts 25 (not shown, see FIG. 13) snap into the column insert recess 342 (not shown, see FIG. 6) and bulkhead insert recess 341 (not shown, see FIG. 6).

To securely fasten the upper interchangeable sill 23 to the upper interchangeable roof and deck assembly 22, bolts will be inserted into the bolt cavity 150 and fastened into the threaded bolt hole inserts 33 molded into the interchangeable deck and roof assembly 22. The lower and upper portions of the FMU 10 are further secured to one another by means of a metal vertical connector bar and bolting assembly 28 that provides a bolted connection to the threaded bolt hole inserts 33 molded into the lower interchangeable deck and roof assembly 22, columns 313, and upper interchangeable deck and roof assembly 22. If required, an integrated photovoltaic panel 70 system will be attached above the upper interchangeable deck and roof assembly 22. Given that the following FMU 10 is an example of a single unit, end type hull connectors 371 are inserted into the hull connector recesses 345 (not shown, see FIG. 2) that are molded into the lower hull 20. The upper portion of the FMU 10 may be securely fastened to additional FMU 10 units by inserting a joint type roof connector 372 into the roof connector recess 322 molded into the interchangeable deck and roof assembly 22 of both FMU's 10 in a clip-like connection.

Figure 2:
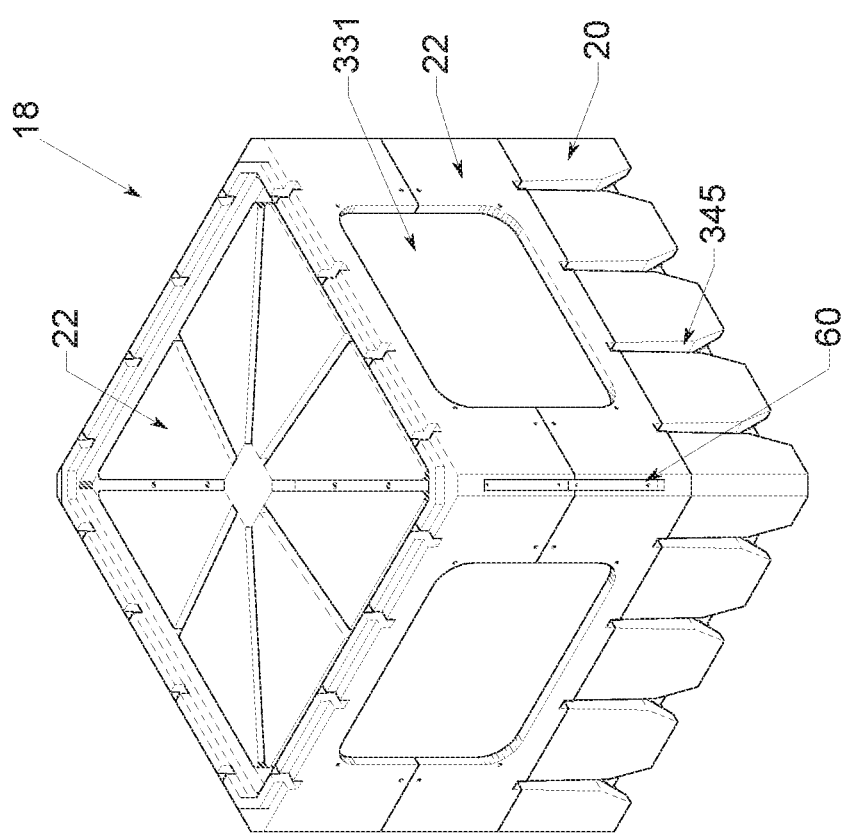
FIG. 2 is a perspective view of a packed, single FMU ready for delivery, according to an embodiment of the present invention.
Figure 19:
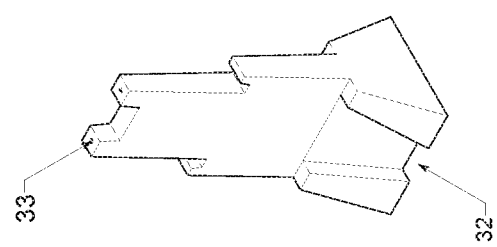
FIG. 19 is a perspective view of a joint type hull connector, according to an embodiment of the present invention.

FIG. 2 is a perspective view of a packed, single FMU 18 ready for delivery, according to an embodiment of the present invention. FIG. 2 illustrates the compact nature of all the components fitting into the shell of the modular lower hull 20 and two interchangeable deck and roof assembly 22 and components and packing bulkhead 331. The overall dimensions of a packed FMU 18 prior to assembly are designed to fit within typical cargo shipping containers and most shipping trucks for ease of transport to final destination according to the embodiment, the dimension of a packed FMU 18 is approximately 2300 millimeters (L)×2300 millimeters (W)×2000 millimeters (H). The overall size, dimensions and stackable nature of the packed FMU 18 system is designed to fit within existing intermodal freight containers for ease of transport to all destinations via ship, truck or plane. Other dimensions of a packed FMU 18 are contemplated which can meet cargo shipping container parameters. The interlocking nature using inserts and recesses allows the deck and roof insert 24 (not shown, see FIG. 3) of the interchangeable deck and roof assembly 22 to slip into the accommodating hull deck recess 350 (not shown, see FIG. 3) of the lower hull 20. The packing bulkhead 331 slides within the bulkhead insert recess 341 of the mirrored interchangeable deck and roof assembly 22 components and all items are secured by attaching a packing bar metal assembly 60 to all four corners and bolting this bar to the mirrored interchangeable deck and roof assembly 22 components. In cases where additional FMU's 10 are to be combined, the hull connector recess 345 found on the lower hull 20 may be plugged with a joint type hull connector 32 as shown in FIG. 19. Additional packing nylon may be added for additional securing of items for transport. As the packed FMU 18 is delivered to a site, users can begin to unpack and pull out all necessary components.

FIG. 3 is an exploded view of a packed FMU 18 having a kit of components, according to an embodiment of the present invention. The packed FMU 18 includes a kit of parts having a lower hull 20, two interchangeable deck and roof assemblies 22, packing bulkheads 331, four columns 313, eight interchangeable sills 23, integrated photovoltaic panels 70, water tank 325, rechargeable battery 327, power controller 329, bulkhead frame 312, hull connector recess 345, and joint type hull connectors 32. An interchangeable deck and roof assembly 22 snaps into place atop of the lower hull 20 by means of deck and roof insert 24 molded into the interchangeable deck and roof assembly 22, which is inserted into the hull deck recess 350. The figure conveys the compact and efficient manner to stow the various components within the primary packing components.

Figure 4:
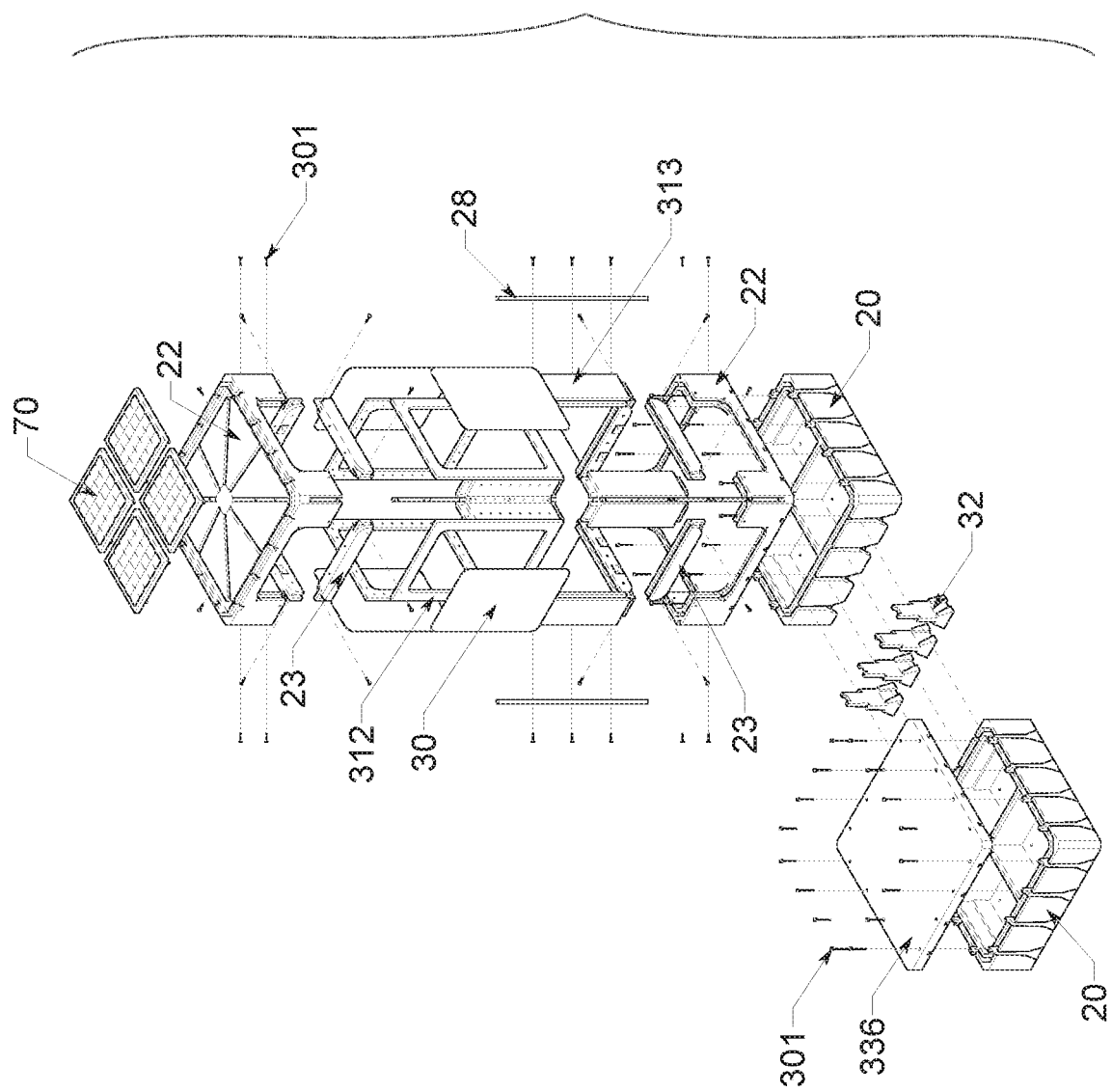
FIG. 4 is an exploded view of an assembled FMU connected to an additional lower hull and flat deck and secured by stainless steel bolt, washer and nut assembly, according to an embodiment of the present invention.

FIG. 4 is an exploded view of an assembled FMU 10 connected to an additional lower hull 20 and flat deck 336 and secured by stainless steel bolt, washer and nut assembly 301, according to an embodiment of the present invention. The figure illustrates how all components are attached in there stacked state. An interchangeable deck and roof assembly 22, snaps into place atop of the lower hull 20 by means of deck and roof insert 24 (not shown, see FIG. 3) molded into the interchangeable deck and roof assembly 22, which is inserted into the hull deck recess 350 (not shown, see FIG. 3). To securely fasten the lower interchangeable deck and roof assembly 22 to the lower hull 20, bolts will be inserted into the bolt cavity 150 (not shown, see FIG. 1) and fastened into the threaded inserts molded into the lower hull 20. A lower interchangeable sill 23 with the sill insert 25 (not shown, see FIG. 13) is placed into a bulkhead insert recess 341 (not shown, see FIG. 6). To securely fasten the lower interchangeable sill 23 to the lower hull 20, stainless steel bolt, washer and nut assembly 301 will be inserted into the bolt cavity 150 (not shown, see FIG. 1) and fastened into the threaded bolt hole inserts 33 (not shown, see FIG. 1) molded into the lower hull 20.

The FMU roof 22 is supported by four corner columns 313 that have upper and lower column inserts 314 (not shown, see FIG. 11) that lock into the column insert recess 342 (not shown, see FIG. 6) of the interchangeable deck and roof assembly 22. A bulkhead frame 312 and attached door/window panel assembly 30 slide into the column recess 316 (not shown, see FIG. 11) and sill recess 344 (not shown, see FIG. 13) similar to a tongue and groove connection. An upper interchangeable sill 23 is rotated 180 degrees from the configuration of the lower interchangeable sill 23 and placed atop the bulkhead frame 312. An upper interchangeable deck and roof assembly 22 is rotated 180 degrees from the lower interchangeable deck and roof assembly 22 of the FMU 10 and placed on top of the upper interchangeable sill 23 and four columns 313 acting as a roof. The upper column inserts 314 (not shown, see FIG. 11) and upper sill inserts 25 (not shown, see FIG. 13) snap into the column insert recess 342 (not shown, see FIG. 6) and bulkhead insert recess 341 (not shown, see FIG. 6). To securely fasten the upper interchangeable sill 23 to the upper interchangeable deck and roof assembly 22, stainless steel bolt, washer and nut assembly 301 will be inserted into the bolt cavity 150 (not shown, see FIG. 1) and fastened into the threaded bolt hole inserts 33 (not shown, see FIG. 1) molded into the interchangeable deck and roof assembly 22. The lower and upper portions of the FMU 10 are further secured to one another by means of a metal vertical connector bar and bolting assembly 28 that provides a bolted connection to the threaded bolt hole inserts 33 molded into the lower interchangeable deck and roof assembly 22, columns 313, and upper interchangeable deck and roof assembly 22. If required, an integrated photovoltaic panel 70 system will be attached above the upper interchangeable deck and roof assembly 22.

Figure 5:
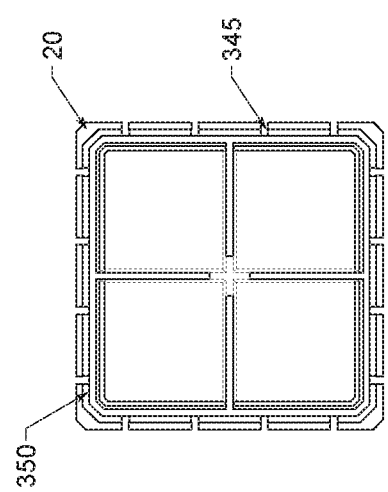
FIG. 5 is a top plan view of a single FMU hull, according to an embodiment of the present invention.

FIG. 5 is a top plan view of a single FMU hull showing the lower hull 20 with molded hull connector recess 345 and hull deck recess 350 fabricated from rotational molded high density polyethylene resin with molded air cavity and injected high density polyurethane foam.

Figure 6:
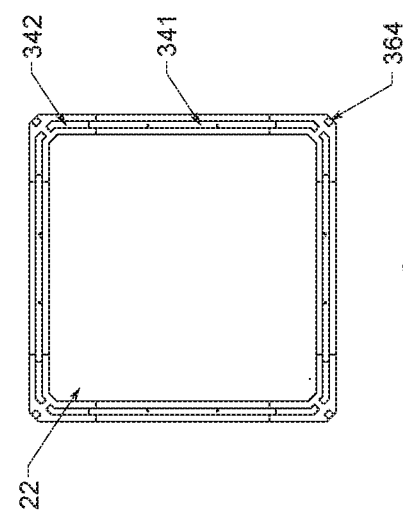
FIG. 6 is a top plan view of a single FMU deck level, according to an embodiment of the present invention

FIG. 6 is a top plan view of a single FMU 10 at the deck level illustrating a lower interchangeable deck and roof assembly 22 in the deck level state with molded bulkhead insert recess 341, column insert recess 342, and vertical connector recess 364.

Figure 7:
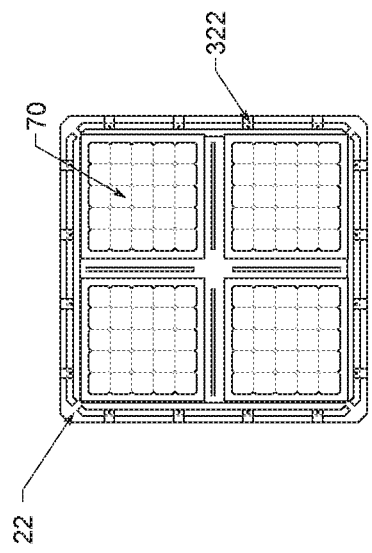
FIG. 7 is a top plan view of a single FMU roof level, according to an embodiment of the present invention.

FIG. 7 is a top plan roof view of a single FMU 10 illustrating interchangeable deck and roof assembly 22 in a roof configuration with molded roof connector recess 322, and optional integrated photovoltaic panel 70.

Figure 8:
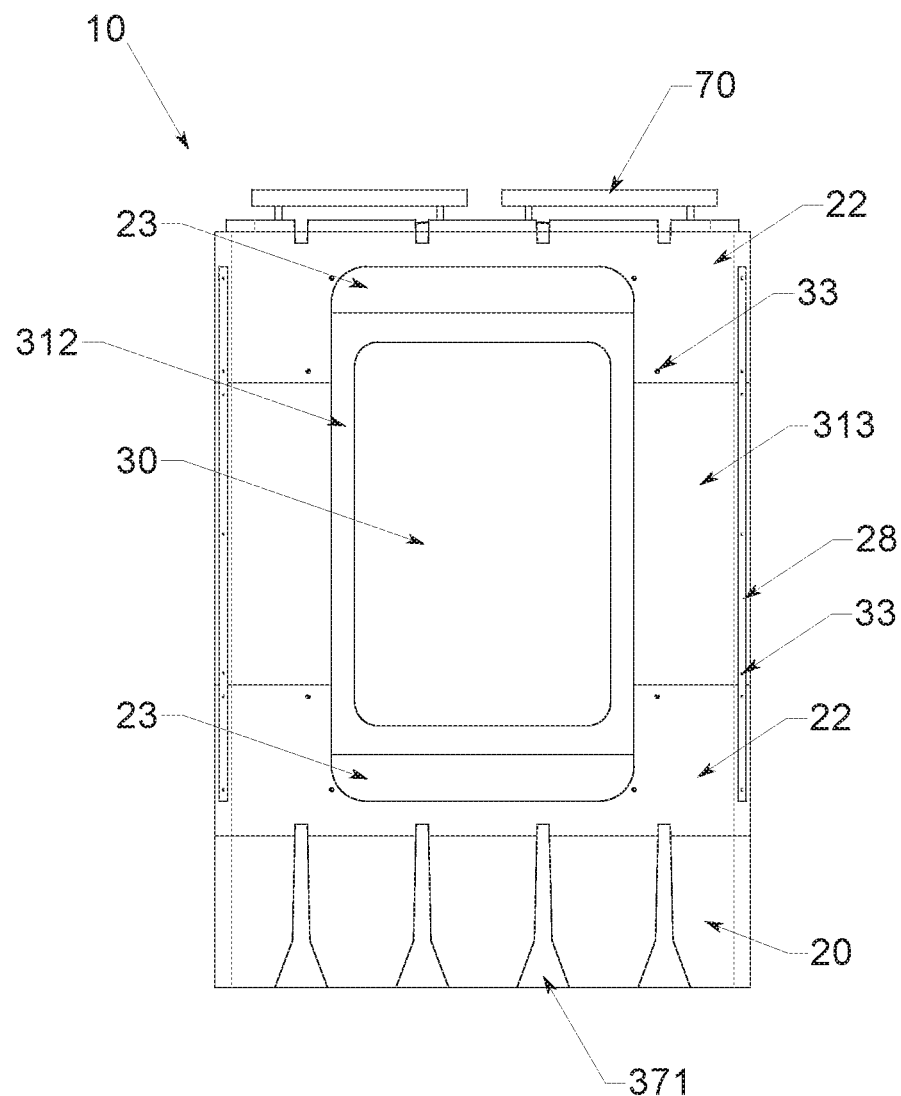
FIG. 8 is an elevation view of a fully assembled single FMU, according to an embodiment of the present invention.

FIG. 8 is an elevation view of a fully assembled FMU 10, according to an embodiment of the present invention. The single FMU 10 can function as a single floating enclosed space, or it can be modified to have open sidewalls or a plurality of sidewall variations to accommodate different user and aesthetic needs. It may be attached to other enclosed or open FMU 10 with or without waterproof tensile fabric canopies 109 (not shown, see FIG. 27) to allow for larger enclosed areas. The FMU 10 derives its flotation from the lower hull 20 and the material attributes as a result of the component being fabricated from rotational molded high-density polyethylene resin with molded air cavity and injected high density polyurethane foam. An interchangeable deck and roof assembly 22, snaps into place atop of the lower hull 20 by means of deck and roof insert 24 (not shown, see FIG. 3) molded into the interchangeable deck and roof assembly 22 being inserted into the hull deck recess 350 (not shown, see FIG. 3). To securely fasten the lower interchangeable deck and roof assembly 22 to the lower hull 20, bolts will be inserted into the bolt cavity 150 (not shown, see FIG. 1) and fastened into the threaded bolt hole insert 33 (not shown, see FIG. 1) molded into the lower hull 20. A lower interchangeable sill 23 with the sill insert 25 (not shown, see FIG. 13) is placed into a bulkhead insert recess 341 (not shown, see FIG. 6). To securely fasten the lower interchangeable sill 23 to the lower hull 20, stainless steel bolt, washer and nut assembly 301 (not shown, see FIG. 4) will be inserted into the bolt cavity 150 (not shown, see FIG. 1) and fastened into the threaded bolt hole inserts 33 molded into the lower hull 20. The FMU 10 roof, comprised of an interchangeable deck and roof assembly 22 is supported by four corner columns 313 that have upper and lower column inserts 314 (not shown, see FIG. 11) that lock into the column insert recess 342 (not shown, see FIG. 6) of the interchangeable deck and roof assembly 22. A bulkhead frame 312 and attached door/window panel assembly 30 slide into the column recess 316 (not shown, see FIG. 11) and sill recess 344 (not shown, see FIG. 13) similar to a tongue and groove connection. An upper interchangeable sill 23 is rotated 180 degrees from the configuration of the lower interchangeable sill 23 and placed atop the bulkhead frame 312. An upper interchangeable deck and roof assembly 22 is rotated 180 degrees from the lower interchangeable deck and roof assembly 22 of the FMU 10 and placed on top of the upper interchangeable sill 23 and four columns 313 acting as a roof. The upper column inserts 314 (not shown, see FIG. 11) and upper sill inserts 25 (not shown, see FIG. 13) snap into the column insert recess 342 (not shown, see FIG. 6) and bulkhead insert recess 341 (not shown, see FIG. 6). To securely fasten the upper interchangeable sill 23 to the upper interchangeable deck and roof assembly 22, bolts will be inserted into the bolt cavity 150 (not shown, see FIG. 1) and fastened into the threaded bolt hole inserts 33 molded into the interchangeable deck and roof assembly 22. The lower and upper portions of the FMU 10 are further secured to one another by means of a metal vertical connector bar and bolting assembly 28 that provides a bolted connection to the threaded bolt hole inserts 33 molded into the lower interchangeable deck and roof assembly 22, columns 313, and upper interchangeable deck and roof assembly 22. If required, an integrated photovoltaic panel 70 system will be attached above the upper interchangeable deck and roof assembly 22. Given that the FMU 10 is an example of a single unit, end type hull connectors 371 are inserted into the hull connector recesses 345 (not shown, see FIG. 2) that are molded into the lower hull 20.

Figure 9:
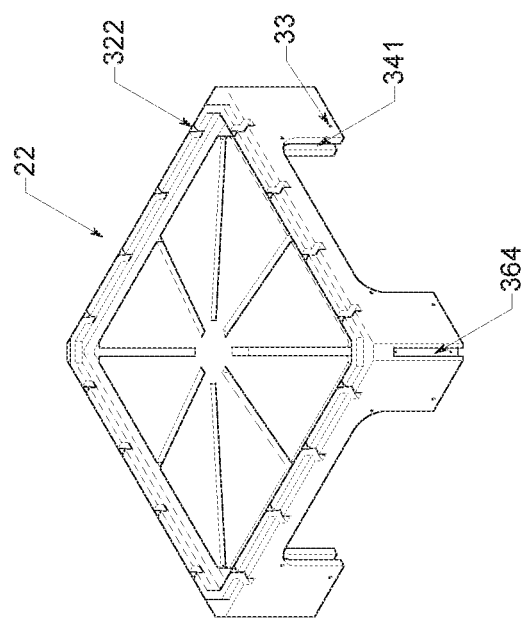
FIG. 9 is a perspective view of an interchangeable deck and roof assembly in a roof configuration mode, according to an embodiment of the present invention.

FIG. 9 is a perspective view of an interchangeable deck and roof assembly 22 in a roof configuration mode, according to an embodiment of the present invention. FIG. 9 illustrates the interchangeable deck and roof assembly 22 in a roof configuration ready for delivery. It is fabricated from rotational molded high-density polyethylene resin with molded air cavity and injected high density polyurethane foam. The term interchangeable is intended to convey that the component has the ability to be oriented in two possible configurations. It has the ability to function as a floor and/or roof depending on the assembled state. The bulkhead insert recess 341 will allow for the interchangeable deck and roof to be attached to bulkhead frame 312 (not shown, see FIG. 1) and interchangeable sill 23 (not shown, see FIG. 1). Both the vertical connector recess 364 and threaded bolt hole insert 33 will allow the interchangeable deck and roof assembly 22 to be secured to other components of the embodied invention. The upper portion of the interchangeable deck and roof assembly 22 can be securely fastened to additional interchangeable deck and roof assembly 22 by inserting a joint type roof connector 372 (not shown, see FIG. 21) into the roof connector recess 322.

The roof connector recess 322 molded into the interchangeable deck and roof assembly 22 will allow additional FMU's 10 to be secured to each other.

Figure 10:
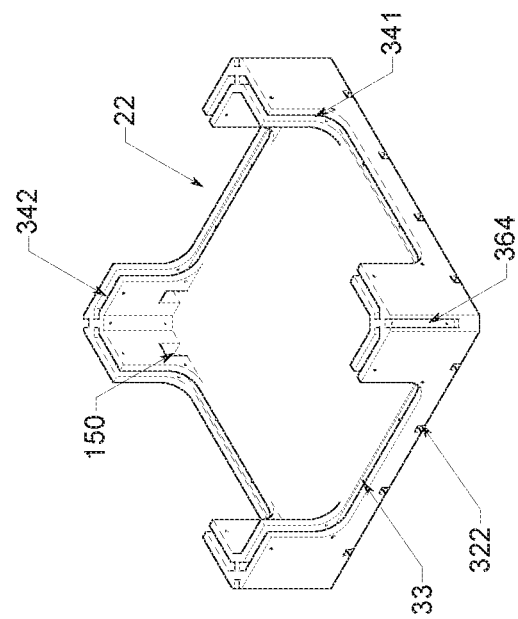
FIG. 10 is a perspective view of an interchangeable deck and roof assembly in a deck configuration mode, according to an embodiment of the present invention.

FIG. 10 is a perspective view of an interchangeable deck and roof assembly 22 in a deck configuration mode, according to an embodiment of the present invention. In this configuration, the interchangeable deck and roof assembly 22 is the flooring and substrate for bulkhead frame 312 (not shown, see FIG. 1) and column 313 (not shown, see FIG. 1). To securely fasten the lower interchangeable deck and roof assembly 22 to the lower hull 20 (not shown, see FIG. 1), bolts will be inserted into the bolt cavity 150 and fastened into the threaded bolt hole inserts 33 molded into the lower hull 20 (not shown, see FIG. 1). Both the vertical connector recess 364 and the threaded bolt hole insert 33 allows the interchangeable deck and roof assembly 22 to be secured to other components of the embodied invention. The bulkhead insert recess 341 will allow for the interchangeable deck and roof assembly 22 to be attached to bulkhead frame 312 (not shown, see FIG. 1) and interchangeable sill 23 (not shown, see FIG. 1). The connector recess 322 will allow the interchangeable deck and roof assembly 22 to more securely attach to the lower hull 20 (not shown, see FIG. 1) by means of joint type hull connector 32 (not shown, see FIG. 4) or end type hull connector 371 (not shown, see FIG. 1). The upper column inserts 314 (not shown, see FIG. 11) and upper sill inserts 25 (not shown, see FIG. 13) snap into the column insert recess 342 and bulkhead insert recess 341.

FIG. 11 is a perspective view of four columns 313, according to an embodiment of the present invention, which provides the connection between the interchangeable deck and roof assembly 22 in the deck configuration to the interchangeable deck and roof assembly 22 in the roof configuration. Each column 313 has an upper and lower column insert 314 which is a protruding flange that will insert into the column insert recess 342 (not shown, see FIG. 6) of the interchangeable deck and roof assembly 22 when in both the deck configuration as shown in FIG. 10 and roof configuration as shown in FIG. 9. A bulkhead insert recess 341 is found along the vertical outside edge of each column 313 and is intended to accept the bulkhead frame 312 (not shown, see FIG. 1). Threaded bolt hole inserts 33 allow various adjacent components to be securely fastened by stainless steel bolt, washer and nut assembly 301 (not shown, see FIG. 4). The vertical connector recess 364 and threaded bolt hole insert 33 will allow the interchangeable deck and roof assembly 22 to be secured to other components of the embodied invention.

Figure 12:
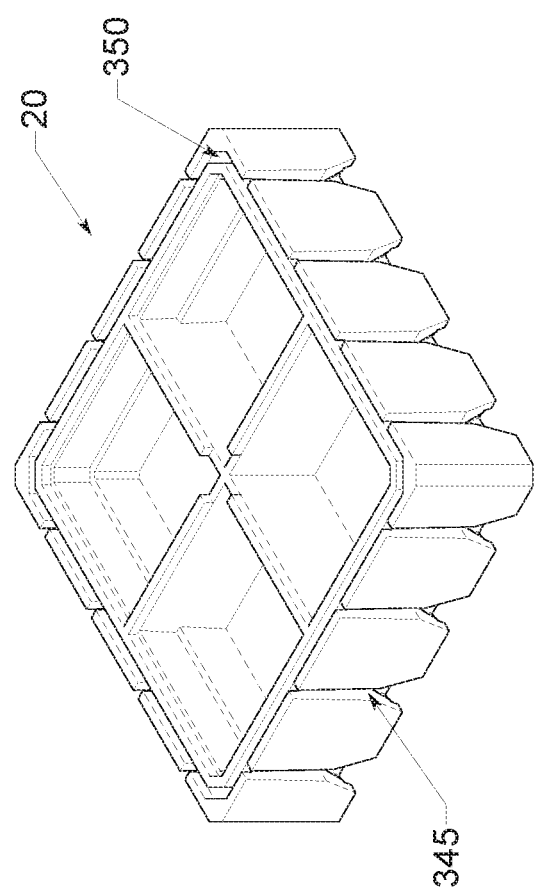
FIG. 12 is a perspective view of a lower hull, according to an embodiment of the present invention.
Figure 20:
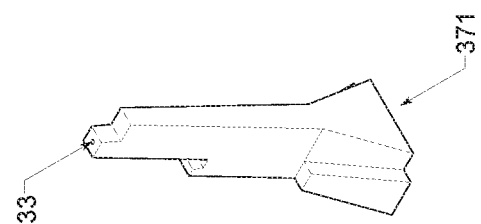
FIG. 20 is a perspective view of an end type hull connector, according to an embodiment of the present invention.

FIG. 12 is a perspective view of a lower hull 20, according to an embodiment of the present invention, which functions in the manner similar to a hull of a boat by which the component is partially submerged within the water allowing it to also float. The lower hull 20 derives its buoyancy from the material attributes as a result of the component being fabricated from rotational molded high density polyethylene resin with molded air cavity and injected high density polyurethane foam. The hull deck recess 350 is formed directly into the lower hull 20 and allows for a connection to the interchangeable deck and roof assembly 22 or flat deck 336 (not shown, see FIG. 4). In cases where only one FMU 10, is required or has a side that does not require additional FMU's 10 to be attached, the hull connector recess 345 may be plugged with an end type hull connector 371 as shown in FIG. 20. In cases where additional FMU's 10 are to be combined, the hull connector recess 345 found on the lower hull 20 may be plugged with a joint type hull connector 32 as shown in FIG. 19.

Figure 13:
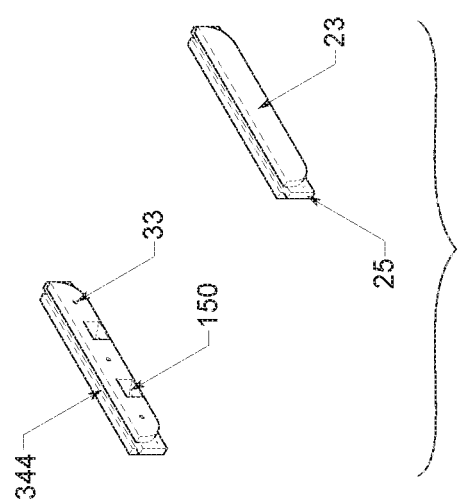
FIG. 13 is a perspective view of two interchangeable sill components, according to an embodiment of the present invention.

FIG. 13 is a perspective view of two interchangeable sills 23, according to an embodiment of the present invention, aligned to be placed into the interchangeable deck and roof assembly 22 when in the deck configuration as shown in FIG. 10. The term interchangeable is intended to convey that the component has the ability to be oriented in two possible configurations, in a lower and upper orientation. Sill inserts 25 are protruding flanges that are intended to insert directly into the molded bulkhead insert recess 341 (see FIG. 9) of the interchangeable deck and roof assembly 22. To securely fasten the lower interchangeable sill 23 to the lower hull 20 (not shown, see FIG. 1), stainless steel bolt, washer and nut assembly 301 (not shown, see FIG. 4) will be inserted into the bolt cavity 150 and fastened into the threaded bolt hole inserts 33 molded into the lower hull 20 (not shown, see FIG. 1).

Figure 14:
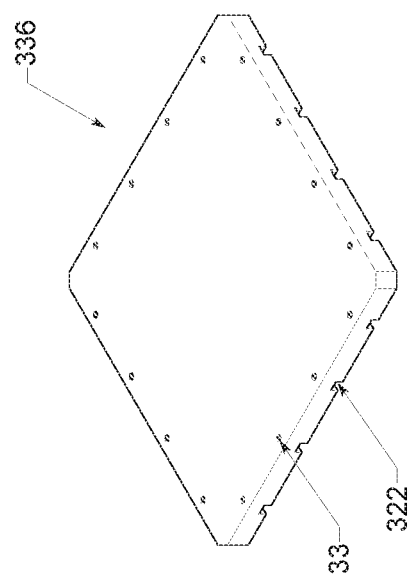
FIG. 14 is a perspective view of a flat deck, according to an embodiment of the present invention.

FIG. 14 is a perspective view of a flat deck 336, according to an embodiment of the present invention, fabricated from rotational molded high density polyethylene resin with molded air cavity and injected high density polyurethane foam which is intended to be secured on top of a lower hull 20 (not shown, see FIG. 1) to create open to air, floating platforms including but not limited to walkways, bridges, plazas and docks. The connector recess 322, located along the perimeter will allow the flat deck 336 to more securely attach to the lower hull 20 (not shown, see FIG. 1) by means of joint type hull connector 32 (not shown, see FIG. 19) or end type hull connector 371 (not shown, see FIG. 20). The threaded bolt hole insert 33, molded into the deck will allow a stainless steel bolt, washer and nut assembly 301 (not shown, see FIG. 4) to securely fasten the flat deck 336 to the lower hull 20 (not shown, see FIG. 1).

Figure 15:
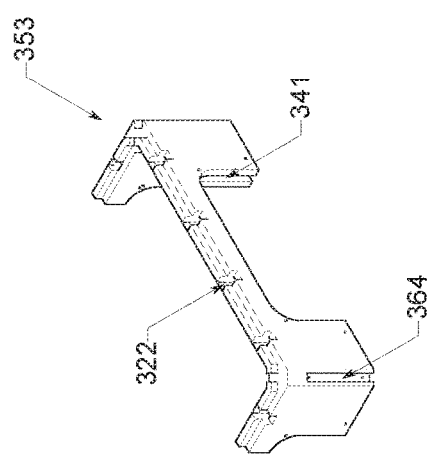
FIG. 15 is a perspective view of a header, according to an embodiment of the present invention.

FIG. 15 is a perspective view of a header 353, according to an embodiment of the present invention, fabricated from rotational molded high density polyethylene resin with molded air cavity and injected high density polyurethane foam intended to be used in areas where it is necessary to reduce the number of columns 313 protruding into a space comprised of several FMU's 10 connected to each other, including but not limited to, waterproof tensile fabric canopies 109 courtyard spaces. The roof connector recess 322 shown allows for the ability to attach the waterproof tensile fabric canopies 109 (not shown, see FIG. 27) assembly and create a waterproof environment. When required, bulkhead insert recess 341 will allow an upper interchangeable sill 23 (not shown, see FIG. 4), bulkhead frame 312 (not shown, see FIG. 4) and door/window panel assembly 30 (not shown, see FIG. 4) to be inserted into place. The vertical connector recess 364 molded into the header 353 will allow a metal vertical connector bar and bolting assembly 28 (not shown, see FIG. 4) to secure the header 353 to columns 313 (not shown, see FIG. 4).

Figure 16:
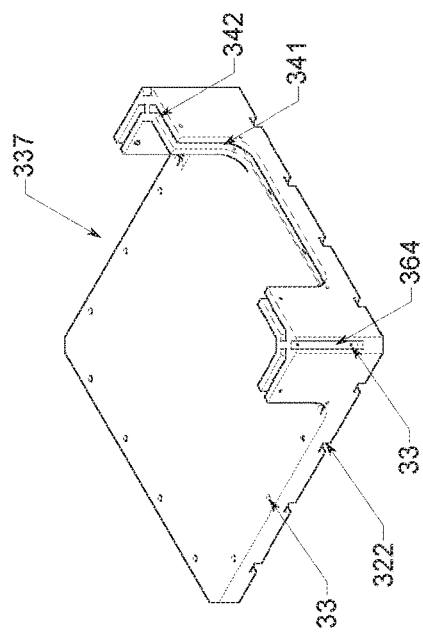
FIG. 16 is a perspective view of a half open deck, according to an embodiment of the present invention.

FIG. 16 is a perspective view of a half open deck 337, according to an embodiment of the present invention, fabricated from rotational molded high density polyethylene resin with molded air cavity and injected high density polyurethane foam intended to be used in areas where it is necessary to reduce the number of columns 313 (not shown, see FIG. 4) protruding into a space comprised of several FMU's 10 connected to each other, including but not limited to, balconies, plazas and courtyards. The roof connector recess 322, located along the perimeter allows the half open deck 337 to more securely attach to the lower hull 20 (not shown, see FIG. 4) by means of joint type hull connector 32 (not shown, see FIG. 19) or end type hull connector 371 (not shown, FIG. 20). The threaded bolt hole insert 33 molded into the deck will allow a stainless steel bolt, washer and nut assembly 301 (not shown, see FIG. 4) to securely fasten the half open deck 337 to the lower hull 20 (not shown, see FIG. 4). When required, bulkhead insert recess 341 will allow a lower interchangeable sill 23 (not shown, see FIG. 4) and bulkhead frame 312 (not shown, see FIG. 4) and door/window panel assembly 30 (not shown, see FIG. 4) to be inserted. Both the vertical connector recess 364 and threaded bolt hole insert 33 will allow the half open deck 337 to be secured to other components of the embodied invention as needed. The upper column inserts 314 (not shown, see FIG. 11) and upper sill inserts 25 (not shown, see FIG. 13) snap into the column insert recess 342 and bulkhead insert recess 341.

Figure 17:
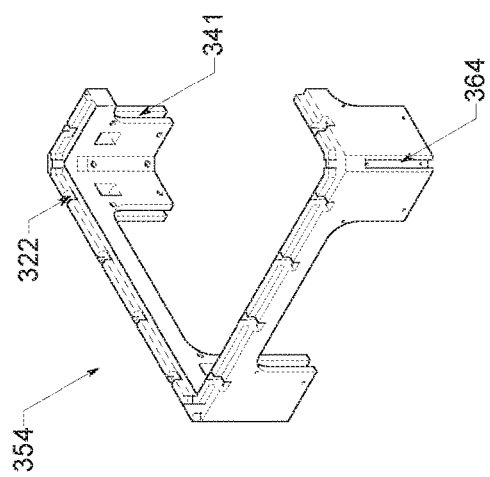
FIG. 17 is a perspective view of a corner header, according to an embodiment of the present invention.

FIG. 17 is a perspective view of a corner header 354, according to an embodiment of the present invention, fabricated from rotational molded high-density polyethylene resin with molded air cavity and injected high-density polyurethane foam intended to be used in areas where it is necessary to reduce the number of columns 313 (not shown, see FIG. 4) protruding into a space comprised of several FMU's 10 connected to each other, including but not limited to, insulated waterproof tensile fabric canopies 109 courtyard spaces. The roof connector recess 322 shown allows for the ability to attach the insulated waterproof tensile fabric canopies 109 (not shown, see FIG. 27) to create a waterproof environment. When required, bulkhead insert recess 341 allows an upper interchangeable sill 23 (not shown, see FIG. 4), bulkhead frame 312 (not shown, see FIG. 4) and door/window panel assembly 30 (not shown, see FIG. 4) to be inserted into place. The vertical connector recess 364 molded into the corner header 354 will allow a metal vertical connector bar with bolting to secure the corner header 354 to columns 313 (not shown, see FIG. 4).

Figure 18:
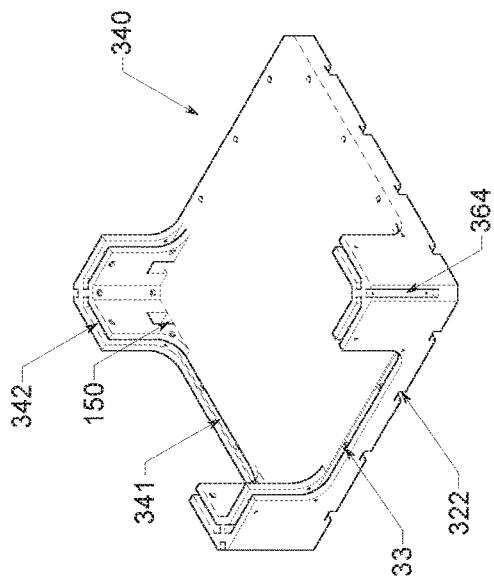
FIG. 18 is a perspective view of a corner deck module, according to an embodiment of the present invention.

FIG. 18 is a perspective view of a corner deck module 340 fabricated from rotational molded high density polyethylene resin with molded air cavity and injected high density polyurethane foam intended to be used in areas where it is necessary to reduce the number of columns 313 (not shown, see FIG. 4) protruding into a space comprised of several FMU's 10 connected to each other, including but not limited to, balconies, plazas and courtyards. The roof connector recess 322, located along the perimeter will allow the corner deck module 340 to more securely attach to the lower hull 20 (not shown, see FIG. 4) by means of joint type hull connector 32 (not shown, see FIG. 19) or end type hull connector 371 (not shown, see FIG. 20). The threaded bolt hole insert 33 molded into the corner deck module 340 will allow a stainless steel bolt assembly 301 to be inserted into the threaded bolt hole inserts 33 located directly above the roof connector recess 322 and inserted into either a joint type hull connector 32 or end type hull connector 371. Additional stainless steel bolt assemblies 301 may be inserted into the bolt cavity 150 located on the corner deck module penetrating a threaded bolt hole insert 33 molded into the corner deck module 340 and attaching to a potential joint type hull connector 32 or end type hull connector 371 depending on circumstance. By tightening this bolted connection, the hull connectors will lock the various components securely. When required, bulkhead insert recess 341 will allow a lower interchangeable sill 23 (not shown, see FIG. 4) and bulkhead frame 312 (not shown, see FIG. 4) and door/window panel assembly 30 (not shown, see FIG. 4) to be inserted. Column insert recess 342 will accommodate the connection of column inserts 314 of columns 313 to fit. Both the vertical connector recess 364 and threaded bolt hole insert 33 will allow the corner deck module 340 to be secured to other components of the embodied invention as needed.

FIG. 19 is a perspective view of a joint type hull connector 32, according to an embodiment of the present invention, fabricated from rotational molded high density polyethylene resin with molded air cavity intended to be plugged into the hull connector recess 345 (not shown, see FIG. 12) of the lower hull 20 (not shown, see FIG. 12) and serve as a connector for both the lower hull 20 and interchangeable deck and roof assembly 22 (not shown, see FIG. 4) as well as for connecting multiple adjacent FMU's 10 together as seen in FIG. 4.

The tapered inclined edges conform to the negative space cavity of the hull connector recess 345 (not shown, see FIG. 12) and provide an interlocking mechanism that helps bind the lower hulls 20 (not shown, see FIG. 4) and interchangeable deck and roof assembly 22 (not shown, see FIG. 4) and flat deck 336 (not shown, see FIG. 4) to each other. Once in place, the joint type hull connector 32 can be more securely fastened to these components by means of a stainless steel bolt, washer and nut assembly 301 (not shown, see FIG. 4) being inserted into the corresponding threaded bolt hole inserts 33 of both the joint type hull connector 32 and lower hull 20 (not shown, see FIG. 4), interchangeable deck and roof assembly 22 (not shown, see FIG. 4) or flat deck 336 (not shown, see FIG. 4).

FIG. 20 is a perspective view of an end type hull connector 371, according to an embodiment of the present invention, fabricated from rotational molded high-density polyethylene resin with molded air cavity intended to be plugged into the hull connector recess 345 (not shown, see FIG. 12) of the lower hull 20 (not shown, see FIG. 12) and serve as a connector for both the lower hull 20 and interchangeable deck and roof assembly 22 in instances where an adjacent lower hull 20 is not to be attached, resulting in a flush edge surface as shown in FIG. 1. The tapered inclined edges conform to the negative space cavity of the hull connector recess 345 (not shown, see FIG. 12) and provide an interlocking mechanism that helps bind the lower hulls 20 (not shown, see FIG. 4) and interchangeable deck and roof assembly 22 (not shown, see FIG. 4) and flat deck 336 (not shown, see FIG. 4) to each other. Once in place, the end type hull connector 371 can be more securely fastened to these components by means of a stainless steel bolt, washer and nut assembly 301 (not shown, see FIG. 4) that is inserted into the corresponding threaded bolt hole inserts 33 of both the end type hull connector 371 and lower hull 20 (not shown, see FIG. 4), interchangeable deck and roof assembly 22 (not shown, see FIG. 4) or flat deck 336 (not shown, see FIG. 4).

Figure 21:
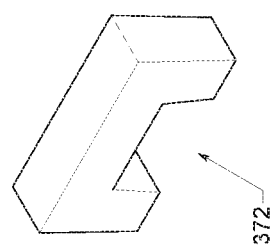
FIG. 21 is a perspective view of a joint type roof connector, according to an embodiment of the present invention.

FIG. 21 is a perspective view of a joint type roof connector 372, according to an embodiment of the present invention, fabricated from rotational molded high-density polyethylene resin with molded air cavity intended to be plugged into the roof connector recess 322 of the interchangeable deck and roof assembly 22 in the roof configuration as cited in FIG. 9 and serve as a connector to bind multiple FMU's 10 at the roof level. The inclined, notched profile slips over the connector recess 322 of two interchangeable deck and roof assemblies 22 and binds and locks the two together.

Figure 22:
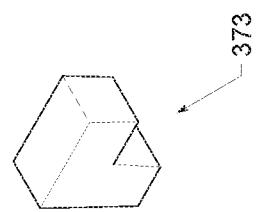
FIG. 22 is a perspective view of an end type roof connector, according to an embodiment of the present invention.

FIG. 22 is a perspective view of an end type roof connector 373, according to an embodiment of the present invention, fabricated from rotational molded high-density polyethylene resin with molded air cavity intended to be plugged into the roof connector recess 322 of the interchangeable deck and roof assembly 22 in the roof configuration as cited in FIG. 9 and serves as a plug to unify the roof edge. The inclined, notched profile slips over the roof connector recess 322 of one interchangeable deck and roof assembly 22.

FIG. 23 is a perspective view of ten enclosed FMU's 10 surrounding a waterproof tensile fabric canopy conjoined to create a larger waterproof assembly area, according to an embodiment of the present invention. FIG. 23 illustrates a typical dwelling unit 338 comprised often of enclosed FMU's 10 surrounding a waterproof tensile fabric canopy configured like a tent 109. The typical dwelling unit 338 is suitable for a plurality of uses while surrounded by adjacent flat decks 336 used for balcony and walkway purposes. The dwelling unit 338 comprises an enclosed courtyard of two half open decks 337 (not shown, see FIG. 25), columns 313 and header 353 (not shown, see FIG. 15) conjoined to create a larger waterproof assembly area. The present embodiment of the invention can serve a plurality of uses. As shown, a series of six linear flat decks 336 stacked on top of lower hulls 20 comprise a walkway bridge that is adjacent to the front entry of the enclosed FMUs 10 and indicated by the door/window panel assembly 30. A guardrail 36, bolted to the flat deck 336 and lower hull 20 provide safety from the water edge when enclosed FMU's 10 are not present. End type hull connectors 371 are also inserted into the lower hulls 20 without other adjacent FMU's 10 and exposed to air.

Figure 24:
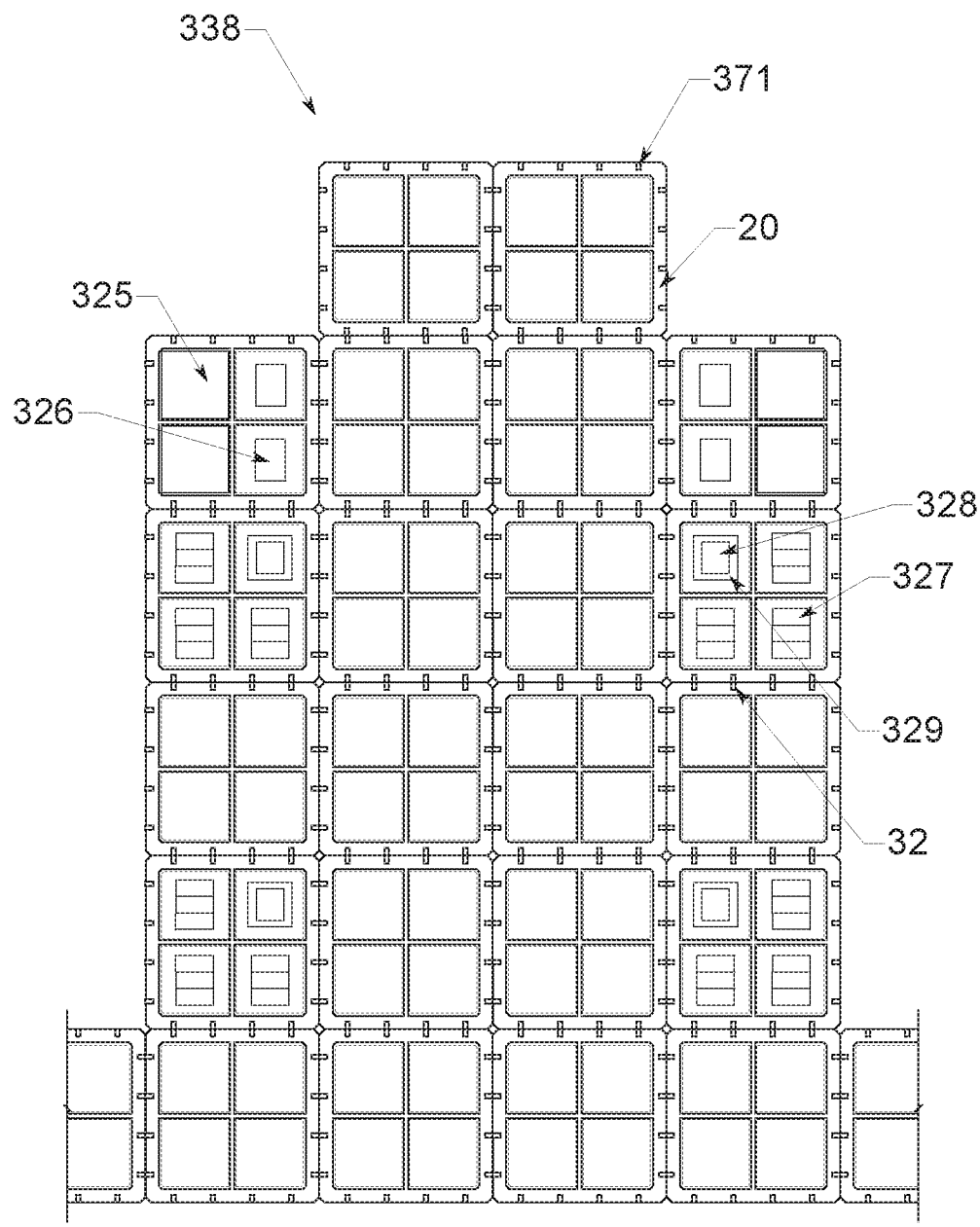
FIG. 24 is a top plan view of a lower hull level, according to an embodiment of the present invention.

FIG. 24 is a top plan view of the lower hull 20 level suitable for a dwelling unit 338 or a plurality of uses, according to an embodiment of the present invention. FIG. 24 illustrates the space below the floor level. The lower hulls 20 are connected to each other by the joint type hull connector 32 and in places where exposed, end type hull connectors 371 are plugged into the hull connector recess 345 (not shown, see FIG. 5). Water tank 325 and water pump 326 are located immediately under the kitchen area 210 and restroom area 220 and within the crawl space of the lower hull 20. Other significant components stowed within the lower hull 20 crawl space include: rechargeable battery 327, power inverter 328, power controller 329.

Figure 25:
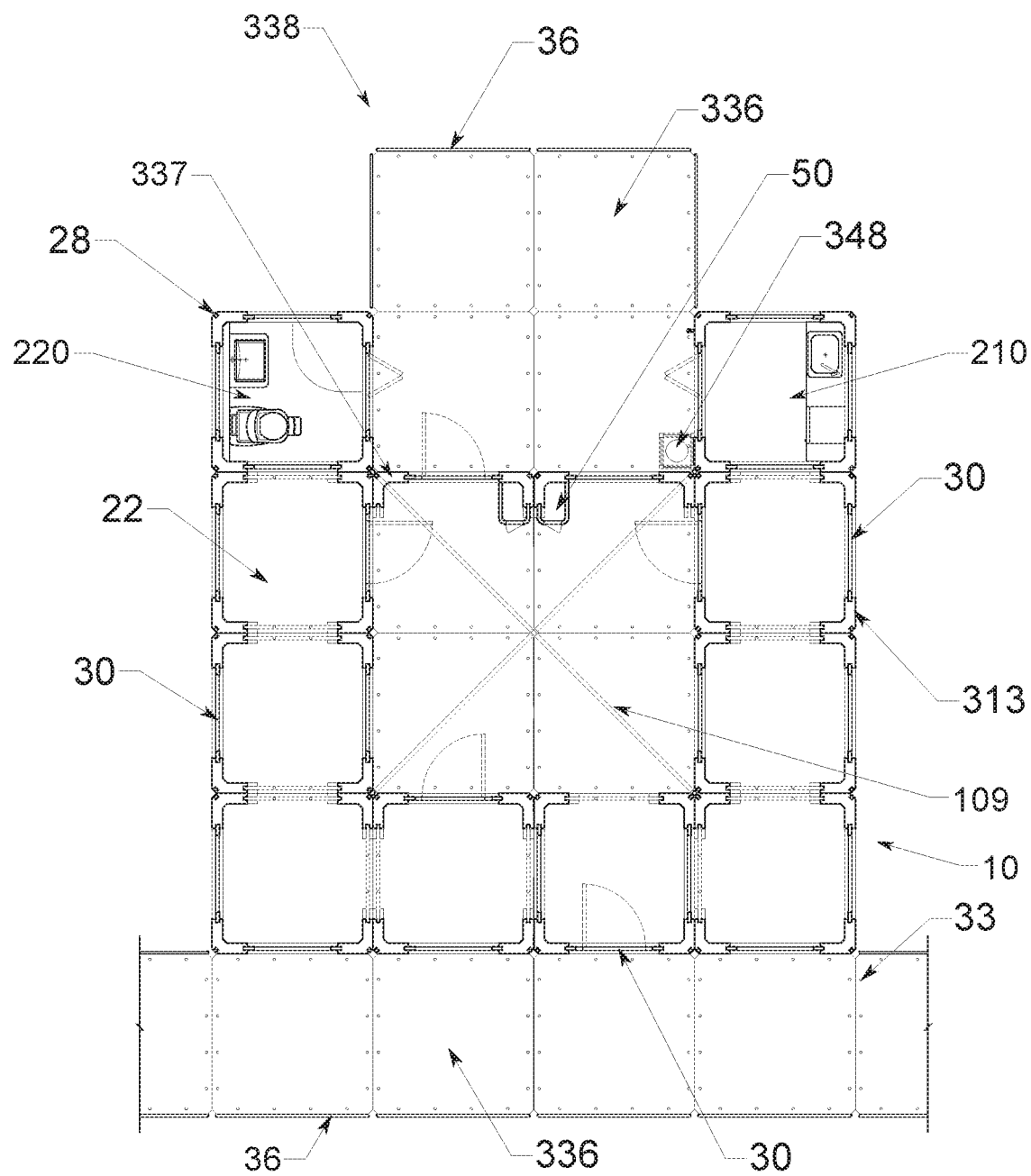
FIG. 25 is a top plan view of a floor deck level suitable for a dwelling unit or a plurality of uses, according to an embodiment of the present invention.

FIG. 25 is a top plan view of the floor deck level suitable for a dwelling unit 338 or a plurality of uses, according to an embodiment of the present invention. FIG. 25 illustrates the condition on the interchangeable deck and roof assembly 22 in the deck configuration. The lower perimeter edge shows the flat deck 336 walkway and balcony located outside the enclosed spaces of the FMU 10 with guardrail 36 to provide protection. Entry into the dwelling unit 338 is accessed by the door/window panel assembly 30. FIG. 25 illustrates ten enclosed FMU's 10 with their corner columns 313 and integrated storage cabinets 50, wrapped around a central courtyard of four FMU's 10 that are covered by a waterproof tensile fabric canopy 109 above. There is also a restroom area 220 and kitchen area 210 with an adjacent, exterior liquid propane gas tank 348 for cooking purposes.

Figure 26:
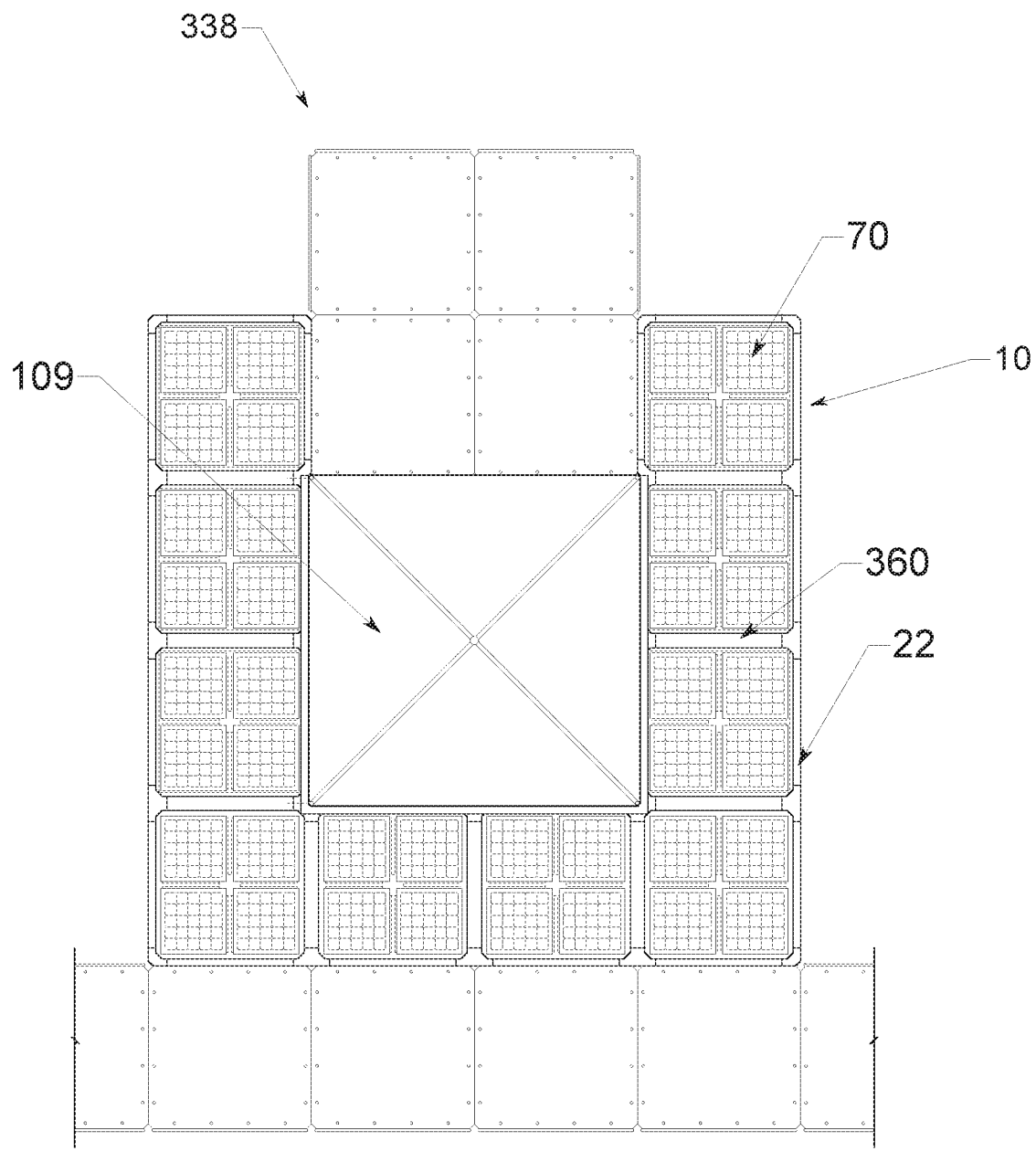
FIG. 26 is a top plan view of a roof level suitable for dwelling or a plurality of uses, according to an embodiment of the present invention.

FIG. 26 is a top plan view of the roof level suitable for a dwelling unit 338 or a plurality of uses, according to an embodiment of the present invention. Linear roof cap connectors 360 provide a secure, waterproof connection between FMU's 10 and are placed over the joint type roof connector 372 (not shown, see FIG. 21) that connects the interchangeable deck and roof assembly 22 components in the roof configuration as shown in FIG. 9. The large central courtyard of the dwelling unit 338 is covered by a waterproof tensile fabric canopy 109 shaped like a tent, while surrounding enclosed FMU's 10 are covered with integrated photovoltaic panels 70.

Figure 27:
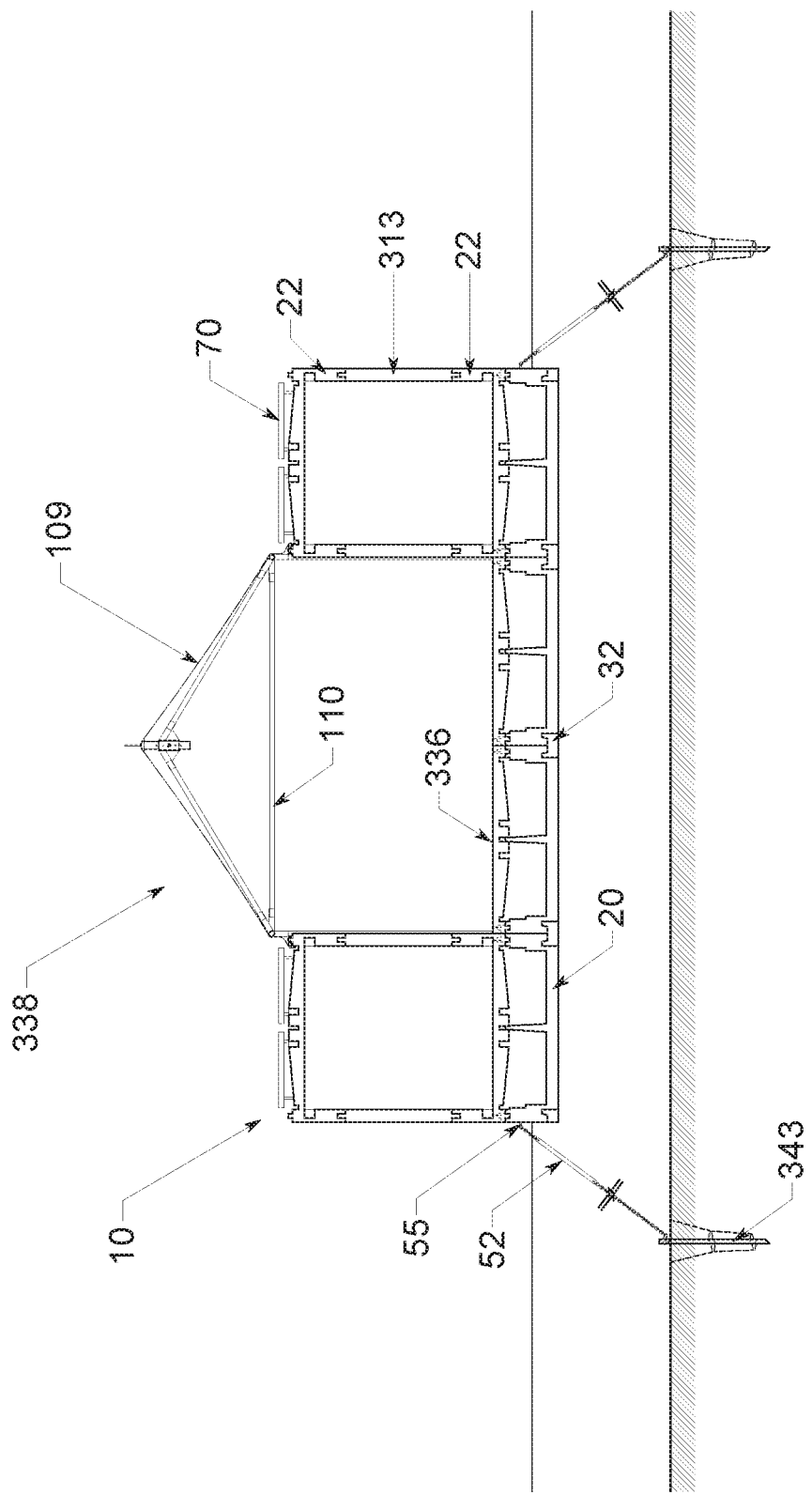
FIG. 27 is a sectional view through a dwelling unit having several enclosed FMU's and an erected waterproof tensile fabric canopy, according to an embodiment of the present invention.

FIG. 27 is a sectional view through a dwelling unit 338 having several enclosed FMU's 10 and an erected waterproof tensile fabric canopies 109, according to an embodiment of the present invention. FIG. 27 illustrates an erected waterproof tensile fabric canopy 109 elevated by the tent structural member 110. The complete assembly is able to stay in place on the water by means of an underwater restraint system comprising an elastic rode 52, which is connected to the steel U-bracket connector 55 attached to the lower hull 20 at one end and to the helical anchor assembly 343 at the other end. The helical anchor assembly 343 anchors the dwelling unit 338 into the earth and prevents the dwelling unit 338 from floating away. When the level of the water rises, the elastic rode 52 stretches allowing the dwelling unit 338 and other intended program uses to rise along with the water level without getting detached from the earth. When the level of the water decreases, the elastic rode 52 contracts allowing the dwelling unit 338 and other intended program uses to descend along with the water level without getting detached from the earth. If required, an integrated photovoltaic panel 70 system will be attached above the upper interchangeable deck and roof assembly 22. The FMU 10 roof is comprised of an interchangeable deck and roof assembly 22 is supported by four corner columns 313.

FIG. 27 further illustrates the lower hull 20 being topped off by the interchangeable deck and roof assembly 22 in the deck configuration when it is an enclosed FMU 10. Columns 313 are inserted into the corners of the interchangeable deck and roof assembly 22 while in the deck state and then topped with a flipped interchangeable deck and roof assembly 22 in the roof configuration, with integrated photovoltaic panels 70 placed on the rooftop. The central courtyard area covered by a waterproof tensile fabric canopy 109, having a deck system that is comprised of both a flat deck 336 and a half open deck 337 (not shown, see FIG. 25) along the perimeter edge where an exterior wall is required. When lower hulls 20 need to be adjacent and connected to other lower hulls 20, they are connected by means of the joint type hull connector 32 being inserted into the molded hull connector recess 345 (not shown, see FIG. 12).

Figure 28:
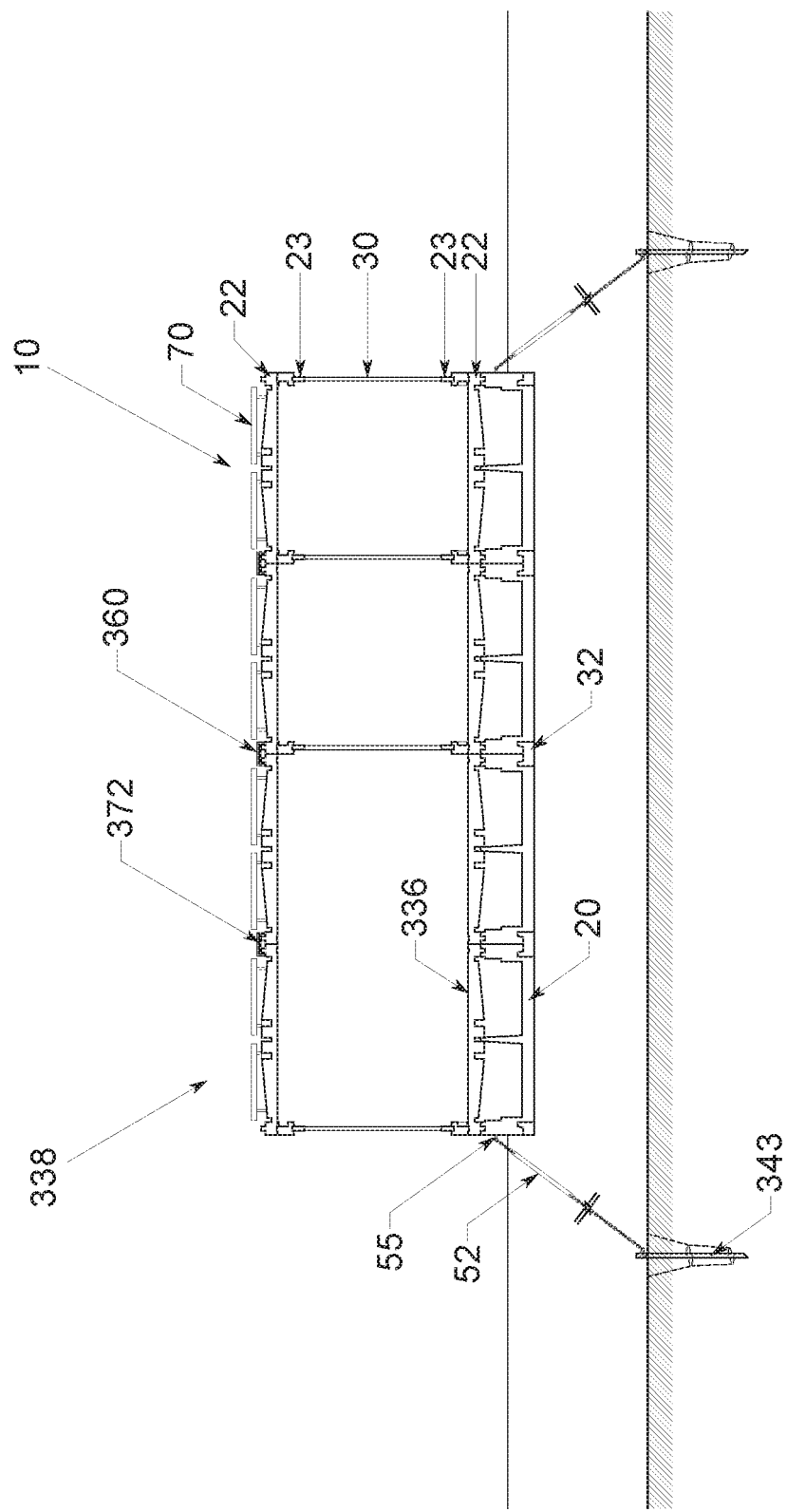
FIG. 28 is a sectional view through several enclosed FMU's, according to an embodiment of the present invention.

FIG. 28 is a sectional view through several enclosed FMU's 10, suitable for a dwelling or a plurality of uses, according to an embodiment of the present invention. The complete assembly, comprising a plurality of flat decks 336, is able to stay in place on the water by means of an underwater restraint system comprising an elastic rode 52, which is connected to the steel U-bracket connector 55 attached to the lower hull 20 at one end and to the helical anchor assembly 343 at the other end. The helical anchor assembly 343 anchors into the earth and prevents the dwelling unit 338 from floating away. When the level of the water rises, the elastic rode 52 stretches allowing the dwelling unit 338 and other intended program uses to rise along with the water level without getting detached from the earth. When the level of the water decreases, the elastic rode 52 contracts allowing the dwelling unit 338 and other intended program uses to descend along with the water level without getting detached from the earth.

FIG. 28 further illustrates the lower hull 20 being topped off by the interchangeable deck and roof assembly 22 in the deck configuration when it is an enclosed FMU 10. The lower interchangeable sill 23 is then inserted into bulkhead recess 341 (not shown, see FIG. 9) of the interchangeable deck and roof assembly 22 while in the deck configuration and then topped with a bulkhead frame 312 (not shown, see FIG. 4) assembly and door/window panel assembly 30. Above this is placed a flipped upper interchangeable sill 23 and flipped interchangeable deck and roof assembly 22 in the roof configuration with the integrated photovoltaic panels 70. When the lower hulls 20 need to be adjacent and connected to other hulls, they are connected by means of the joint type hull connector 32 being inserted into the molded hull connector recess 345 (not shown, see FIG. 12). Linear roof cap connectors 360 provide a secure, waterproof connection between FMU's 10 and are placed over the joint type roof connector 372 that connects the interchangeable deck and roof assembly 22 components in the roof configuration as shown in FIG. 9.

Figure 29:
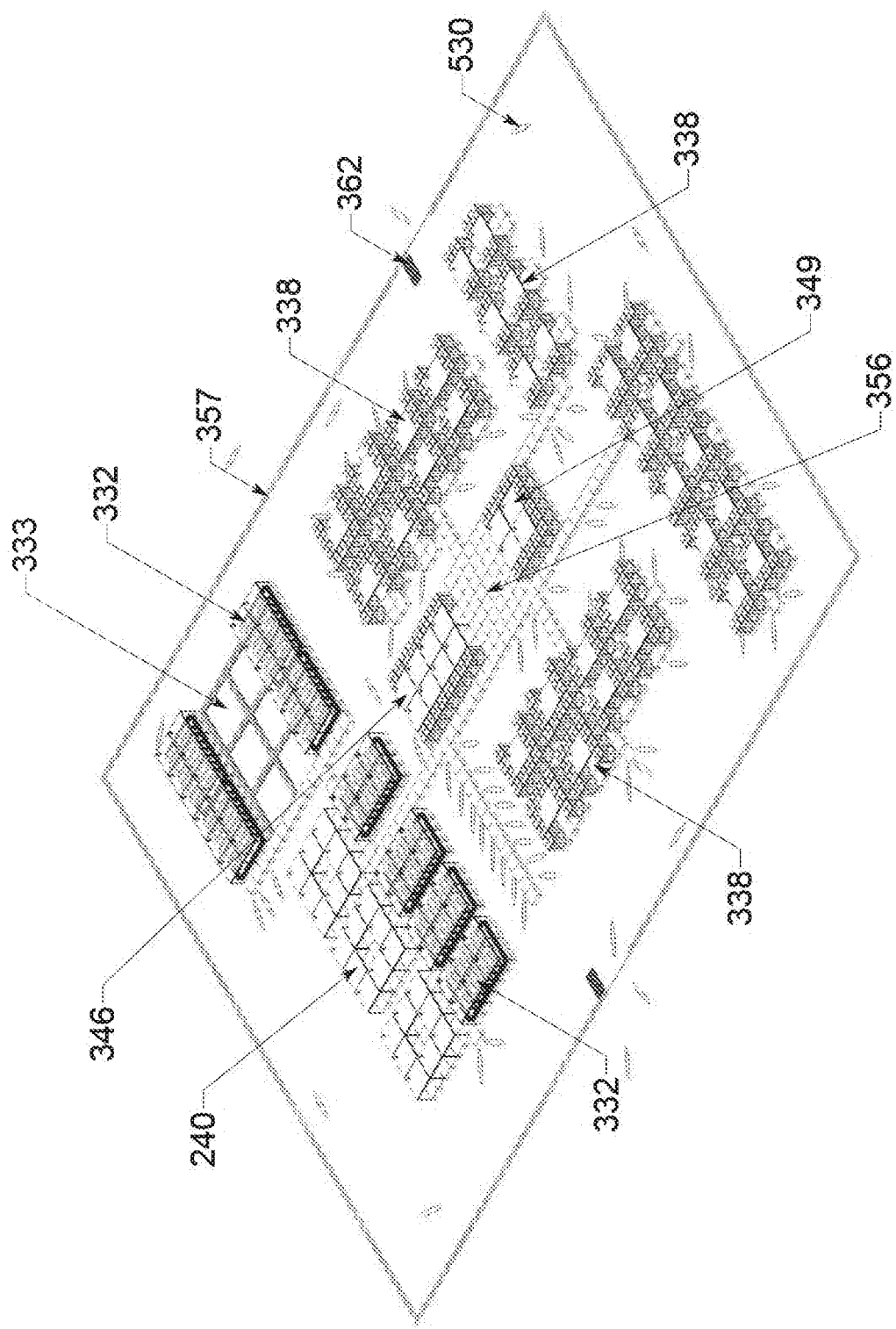
FIG. 29 is a perspective view showing various FMU configurations arranged and attached to each other to create a floating community, according to an embodiment of the present invention.

FIG. 29 is a perspective view showing various FMU 10 configurations arranged and attached to each other to create a floating community, according to an embodiment of the present invention. A plurality of configurations can be created to meet the current and evolving needs of its intended users while providing a more sustainable community. These program uses may include the following uses: livestock 240, agriculture 332, aquaculture/fish farm 333, dwelling unit 338, large assembly unit 346, medium assembly unit 349, plaza 356, pontoon security fence perimeter 357, and security platform 362. FIG. 29 illustrates an overall floating masterplan of how the previously cited program configurations in the preceding figures are attached to one another by means of the joint type hull connector 32 to create a larger community while also allowing boats 530 access to the many perimeter edges.

Figure 30:
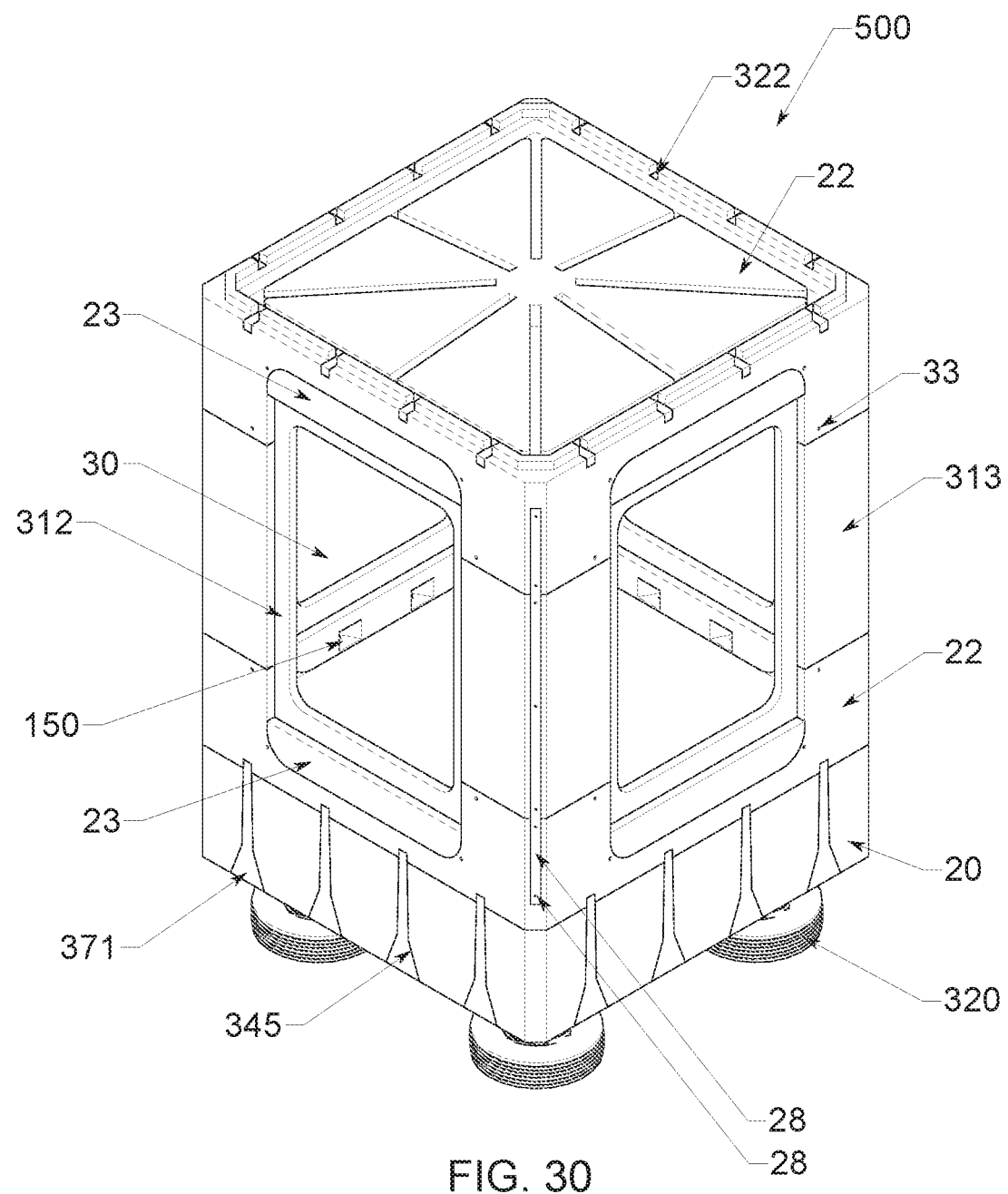
FIG. 30 is a perspective view showing a fully assembled single land module unit (LMU), according to an embodiment of the present invention.

FIG. 30 is a perspective view showing a fully assembled single land module unit (LMU) 500 of a single story, according to an embodiment of the present invention having the land wheel base isolation system 320 located under the lower hull 20. The LMU 500 is assembled in a similar manner as the FMU 10 cited in FIG. 1. A single LMU 500 can function as a single enclosed space, or it can be modified to have open sidewalls and or open to the sky. It may be attached to other LMU 500 with or without waterproof tensile fabric canopies 109 (not shown, see 35) to allow for larger enclosed areas and LMU's 500 may be stacked vertically to create multi-level configurations (i.e. multi-stories). The LMU 500 is fabricated from the same identical components previously cited with respect to the FMU 10 and are fabricated with rotational molded high density polyethylene resin with molded air cavity and injected high density polyurethane foam.

An interchangeable deck and roof assembly 22, snaps into place atop of the lower hull 20 by means of deck and roof insert 24 (not shown, see FIG. 3) molded into the interchangeable deck and roof assembly 22 being inserted into the hull deck recess 350 (not shown, see FIG. 12). To securely fasten the lower interchangeable deck and roof assembly 22 to the lower hull 20, bolts will be inserted into the bolt cavity 150 and fastened into the threaded inserts molded into the lower hull 20. A lower interchangeable sill 23 with the sill insert 25 (not shown, see FIG. 13) is placed into a bulkhead insert recess 341 (not shown, see FIG. 6). To securely fasten the lower interchangeable sill 23 to the lower hull 20, stainless steel bolt, washer and nut assembly 301 (not shown, see FIG. 4) will be inserted into the bolt cavity 150 and fastened into the threaded bolt hole inserts 33 molded into the lower hull 20.

The LMU's 500, roof is comprised of an interchangeable deck and roof assembly 22 supported by four corner columns 313 that have upper and lower column inserts 314 (not shown, see FIG. 11) that lock into the column insert recess 342 (not shown, see FIG. 10) of the interchangeable deck and roof assembly 22. A bulkhead frame 312 (not shown, see FIG. 4) and attached door/window panel assembly 30 slide into the column recess 316 (not shown, see FIG. 11) and sill recess 344 (not shown, see FIG. 13) similar to a tongue and groove connection. An upper interchangeable sill 23 is rotated 180 degrees from the configuration of the lower interchangeable sill 23 and placed atop the bulkhead frame 312 (not shown, see FIG. 4). An upper interchangeable deck and roof assembly 22 is rotated 180 degrees from the lower interchangeable deck and roof assembly 22 of the LMU 500 and placed on top of the upper interchangeable sill 23 and four columns 313 acting as a roof. The upper column inserts 314 (not shown, see FIG. 11) and upper sill inserts 25 (not shown, see FIG. 13) snap into the column insert recess 342 (not shown, see FIG. 6) and bulkhead insert recess 341 (not shown, see FIG. 6).

To securely fasten the upper interchangeable sill 23 to the upper interchangeable roof assembly 22, bolts will be inserted into the bolt cavity 150 (not shown, see FIG. 1) and fastened into the threaded bolt hole inserts 33 molded into the interchangeable deck and roof assembly 22. The lower and upper portions of the LMU 500 are further secured to one another by means of a metal vertical connector bar and bolting assembly 28 that provides a bolted connection to the threaded bolt hole inserts 33 molded into the lower interchangeable deck and roof assembly 22, columns 313, and upper interchangeable deck and roof assembly 22. If required, an integrated photovoltaic panel 70 system will be attached above upper interchangeable deck and roof assembly 22. Given that the following LMU 500 is an example of a single unit, end type hull connectors 371 are inserted into the hull connector recesses 345 that are molded into the lower hull 20. The LMU 500 utilizes a wheel base isolation foundation 320 to transfer loads from the LMU 500 to the ground. The connector recess 21 will allow the interchangeable deck and roof assembly 22 to more securely attach to the lower hull 20 (not shown, see FIG. 1). Given that the LMU 500 is an example of a single unit, end type hull connectors 371 are inserted into the hull connector recesses 345 that are molded into the lower hull 20.

Figure 31:
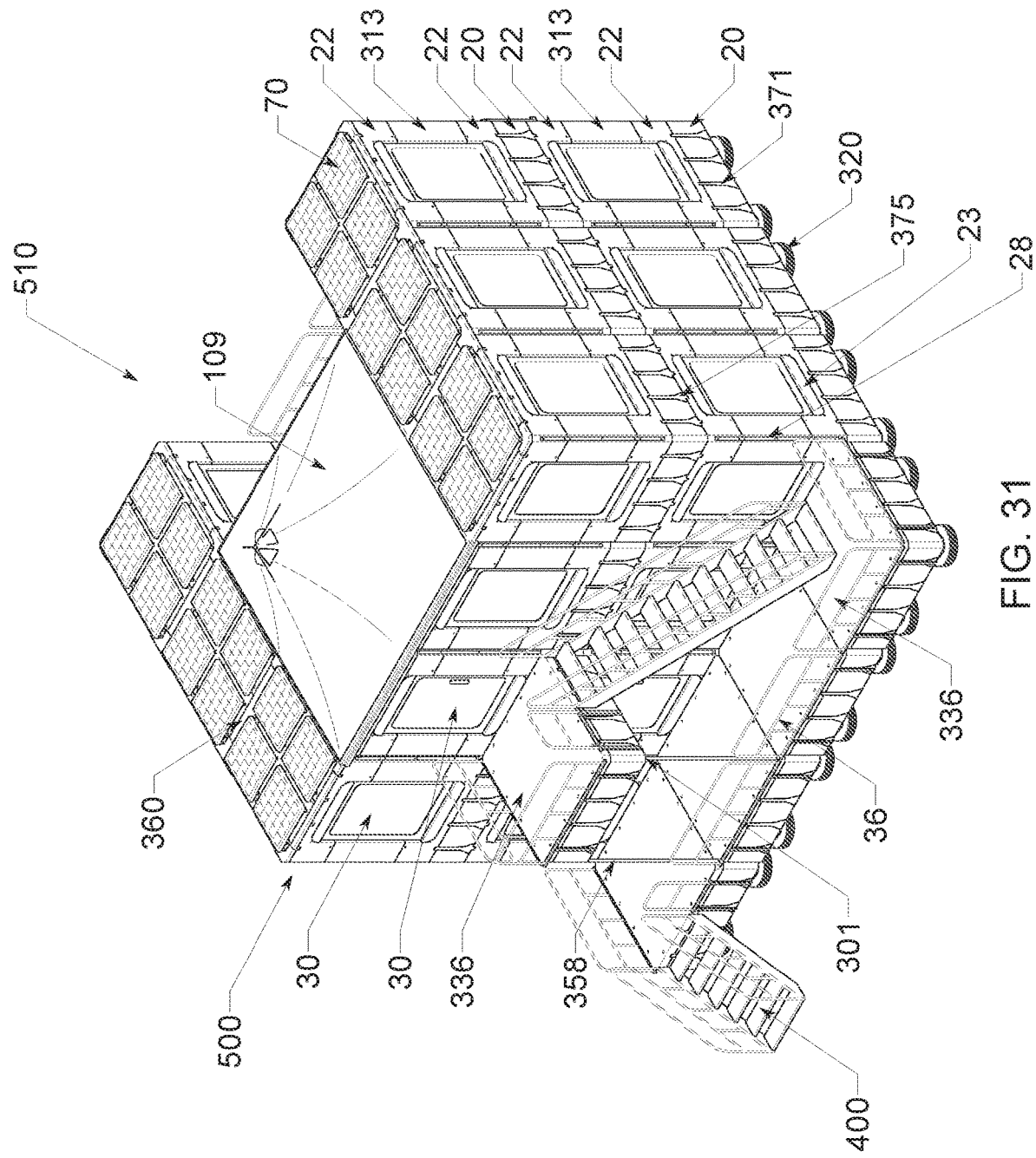
FIG. 31 is a perspective view of several LMU's stacked and removably connected to create a two-story LMU assembly suitable for a plurality of uses, according to an embodiment of the present invention.

FIG. 31 is a perspective view of several LMU's 500 stacked and removably connected to create a two-story LMU 510 assembly suitable for a plurality of uses, according to an embodiment of the present invention. The elevated two-story LMU assembly 510 is accessed via the stair assembly 400 and exterior walkway flat deck 336. An interchangeable deck and roof assembly 22, snaps into place atop of the lower hull 20 by means of deck and roof insert 24 (not shown, see FIG. 3) molded into the interchangeable deck and roof assembly 22 being inserted into the hull deck recess 350 (not shown, see FIG. 12). To securely fasten the lower interchangeable deck and roof assembly 22 to the lower hull 20, bolts will be inserted into the bolt cavity 150 (not shown, see FIG. 30) and fastened into the threaded inserts molded into the lower hull 20. A lower interchangeable sill 23 with the sill insert 25 (not shown, see FIG. 13) is placed into a bulkhead insert recess 341 (not shown, see FIG. 6). To securely fasten the lower interchangeable sill 23 to the lower hull 20, stainless steel bolt, washer and nut assembly 301 (not shown, see FIG. 4) will be inserted into the bolt cavity 150 (not shown, see FIG. 30) and fastened into the threaded bolt hole inserts 33 (not shown, see FIG. 30) molded into the lower hull 20. The LMU 500 roof, comprised of an interchangeable deck and roof assembly 22 is supported by four corner columns 313 (not shown, see FIG. 11) that have upper and lower column inserts 314 (not shown, see FIG. 11) that lock into the column insert recess 342 (not shown, see FIG. 10) of the interchangeable deck and roof assembly 22.

A bulkhead frame 312 (not shown, see FIG. 30) and attached door/window panel assembly 30 slide into the column recess 316 (not shown, see FIG. 11) and sill recess 344 (not shown, see FIG. 13) similar to a tongue and groove connection. An upper interchangeable sill 23 is rotated 180 degrees from the configuration of the lower interchangeable sill 23 and placed atop the bulkhead frame 312 as illustrated in FIG. 4. An upper interchangeable deck and roof assembly 22 is rotated 180 degrees from the lower interchangeable deck 22 of the LMU 500 and placed on top of the upper interchangeable sill 23 and four columns 313 acting as a roof as illustrated in FIG. 4. The upper column inserts 314 (not shown, see FIG. 11) and upper sill inserts 25 (not shown, see FIG. 13) snap into the column insert recess 342 (not shown, see FIG. 10) and bulkhead insert recess 341 (not shown, see FIG. 10). To securely fasten the upper interchangeable sill 23 to the upper interchangeable deck and roof assembly 22 bolts will be inserted into the bolt cavity 150 (not shown, see FIG. 1) and fastened into the threaded bolt hole inserts 33 (see FIG. 30) molded into the interchangeable deck and roof assembly 22.

The lower and upper portions of the LMU 500 are further secured to one another by means of a metal vertical connector bar and bolting assembly 28 that provides a bolted connection to the threaded bolt hole inserts 33 (not shown, see FIG. 30) molded into the lower interchangeable deck and roof assembly 22, columns 313, and upper interchangeable deck and roof assembly 22. A joint type roof stack connector 374 (not shown, see FIG. 38) and end type roof stack connector 375 are used to bind the lower and upper levels of the two-story LMU assembly 510 and the assembly of the second level conforms to the same sequencing as outlined for level one. An upper level open space is covered by a waterproof tensile fabric canopy shaped like a tent 109. Elevated exterior decks used for balconies and/or stair landings will incorporate a structural post column 358 at each corner not attached or directly adjacent to an LMU 500 to provide additional support to accommodate loading. A stainless steel bolt, washer and nut assembly 301 will be used to attach the post column 358 to the lower hull 20. The upper portion of the LMU 500 may be securely fastened to additional LMU 500 units by inserting a joint type roof connector 372 (not shown, see FIG. 21) and/or linear roof cap connector 360 onto the roof connector recess 322 (not shown, see FIG. 1) molded into the interchangeable deck and roof assembly 22 of both LMU 500 units in a clip-like connection.

If required, an integrated photovoltaic panel 70 system will be attached above the second level upper interchangeable deck and roof assembly 22. A guardrail 36 is placed along the perimeter of the elevated walkways to safeguard users. The two-story LMU assembly 510 utilizes a wheel base isolation foundation 320 to transfer loads from the overall assembly to the ground. End type hull connectors 371 are also inserted into the lower hulls 20 without other adjacent LMU's 500 and exposed to air. Pedestrian access to both levels of the two-story LMU 510, will be by means of a stair assembly 400 and/or ramp assembly (not shown) depending on desired configuration.

Figure 32:
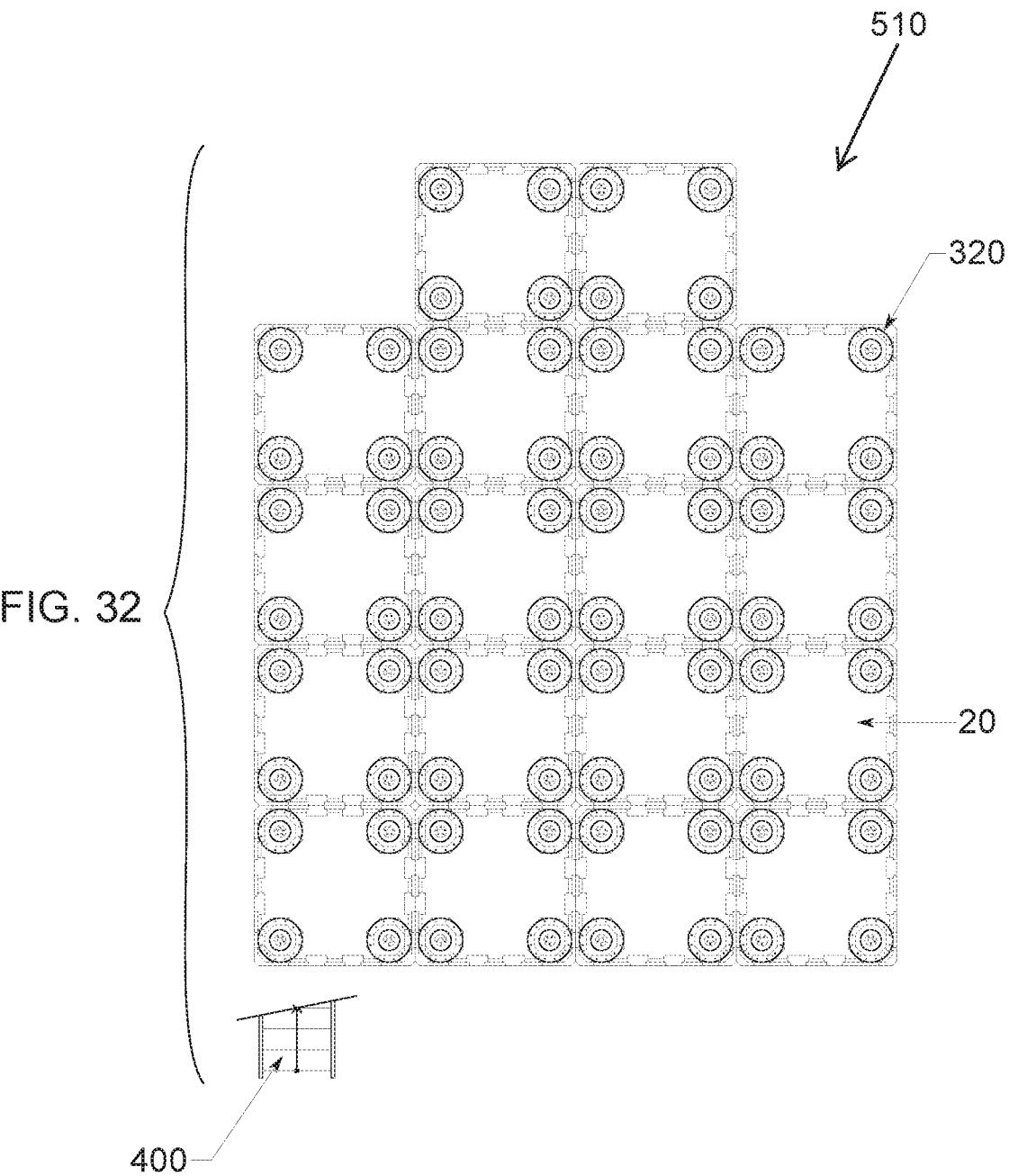
FIG. 32 is a top plan view of the ground level two-story land module unit assembly land base isolation system and sectional view of stair, according to an embodiment of the present invention.

FIG. 32 is a top plan view of the ground level two-story land module unit assembly 510, according to an embodiment of the present invention, having the land wheel base isolation system 320 located under the lower hull 20 with joint type hull connectors 32 (not shown, see FIG. 4) binding the first level hulls together. The ground level two-story land module unit assembly 510 illustrated in FIG. 32 can be used for a plurality of uses. The sectional view of the stair 400 illustrates the stair 400 at the bottom level of the assembly 510.

Figure 33:
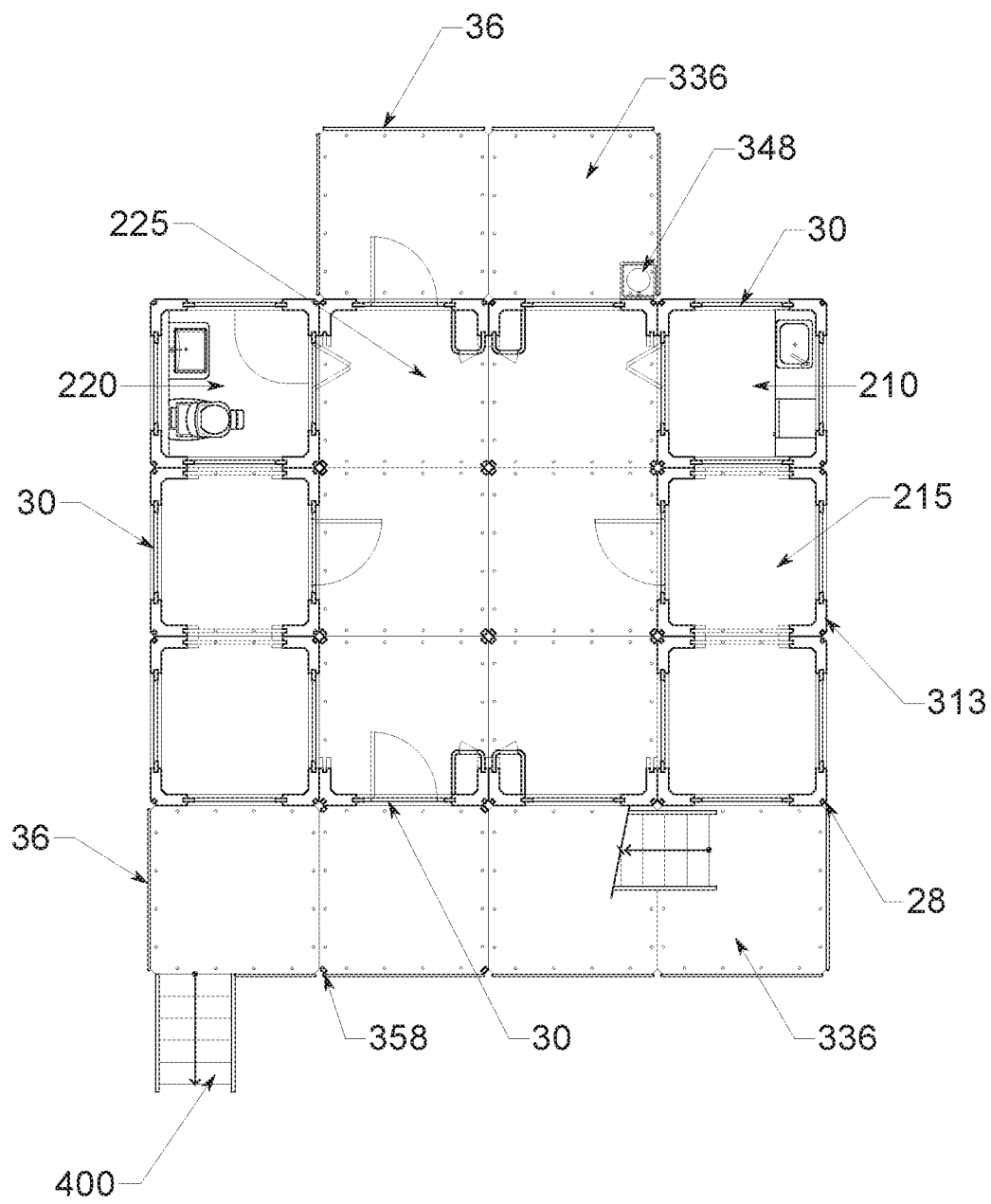
FIG. 33 is a top plan view of the first level of the two-story LMU assembly, according to an embodiment of the present invention.

FIG. 33 is a top plan view of the first level for the two-story LMU assembly 510, according to an embodiment of the present invention. FIG. 33 illustrates a typical room layout including a kitchen area 210, typical room 215, restroom area 220, and central room 225. Adjacent to the kitchen area 210 is an exterior liquid propane gas tank 348. All enclosed perimeter walls utilize a door/window panel assembly 30 that may be customized to fit user needs and aesthetic preferences. An elevated exterior walkway outside the rooms is comprised of a flat deck 336 assembly resting on top of the lower hull 20. Access to the first and second level is by means of a stair assembly 400. A guardrail 36 is placed along the perimeter of the walkways to safeguard users.

Figure 34:
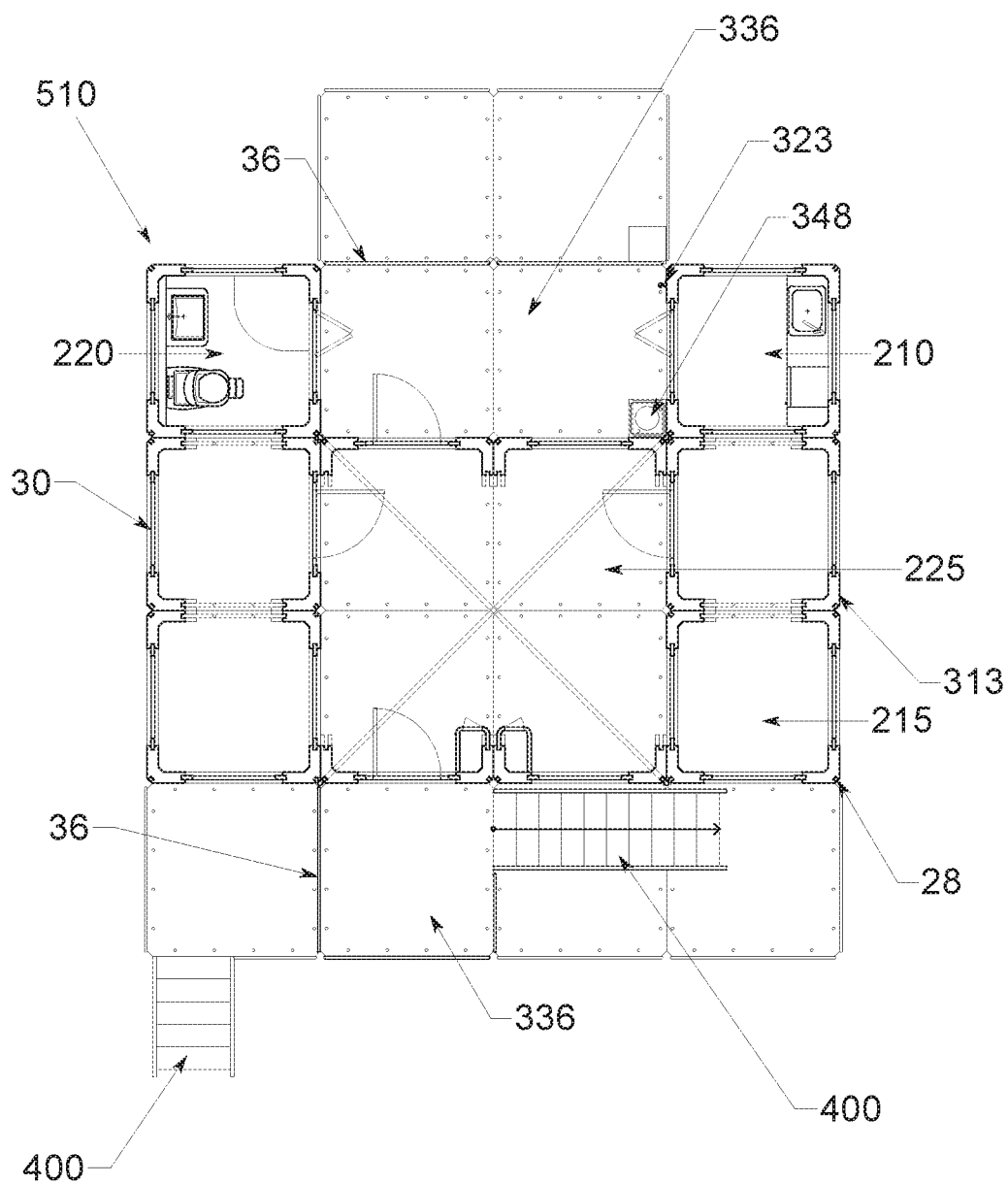
FIG. 34 is a top plan view of the second level of the two-story LMU assembly, according to an embodiment of the present invention.

FIG. 34 is a top plan view of the second level of the two-story LMU assembly 510, according to an embodiment of the present invention. FIG. 34 illustrates a typical room layout including kitchen area 210, typical room 215, restroom area 220, and central room 225, suitable for a plurality of uses. There is an exterior liquid propane gas tank 348 for cooking purposes. All enclosed perimeter walls utilize a door/window panel assembly 30 that may be customized to fit user's needs and aesthetic preferences. A bibcock 323 attached to the exterior wall of the kitchen area 210 module to allow for access and connectivity to water. An elevated exterior walkway outside the rooms is comprised of a flat deck 336 assembly resting on top of the lower hull 20. Access to the first and second level is by means of a stair assembly 400. A guardrail 36 is placed along the walkways to safeguard users. The two-story LMU assembly is supported by four corner columns 313. The lower and upper portions of the two-story LMU assembly 510 are further secured to one another by means of a metal vertical connector bar and bolting assembly 28 that provides a bolted connection to the threaded bolt hole inserts 33 molded into the lower interchangeable deck and roof assembly 22, columns 313, and upper interchangeable deck and roof assembly 22 as shown in FIG. 36.

Figure 35:
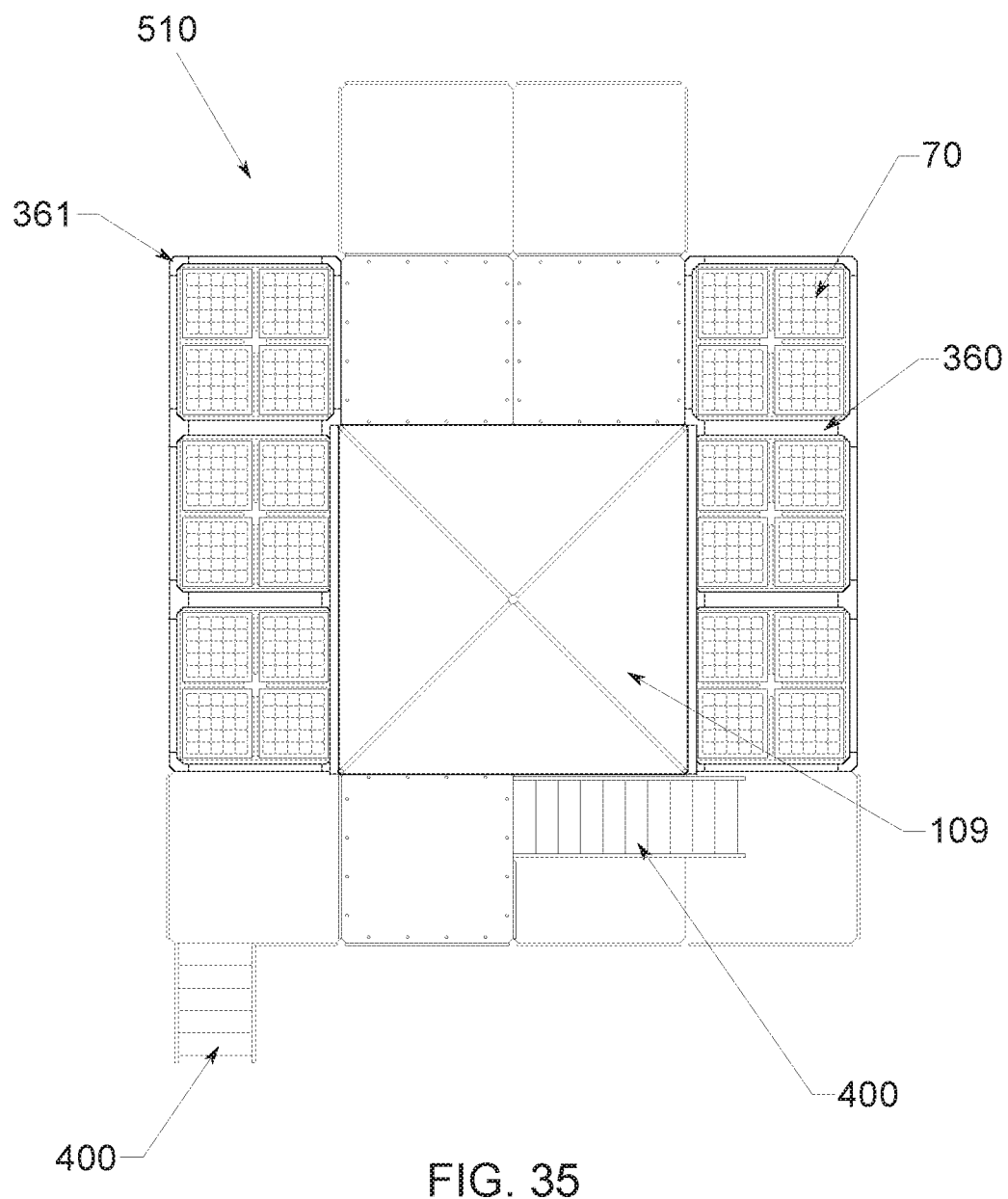
FIG. 35 is a top plan view of the roof level of the two-story LMU assembly, according to an embodiment of the present invention.

FIG. 35 is a top plan view of the roof level of the two-story LMU assembly 510, according to an embodiment of the present invention. FIG. 35 illustrates an assembly suitable for a plurality of uses. There is an integrated photovoltaic panel 70, linear roof cap connector 360, waterproof tensile fabric canopy 109, and corner roof cap connector 361. There is also a plurality of stair assemblies that allow users to access the various levels of the two-story LMU assembly 510.

Figure 36:
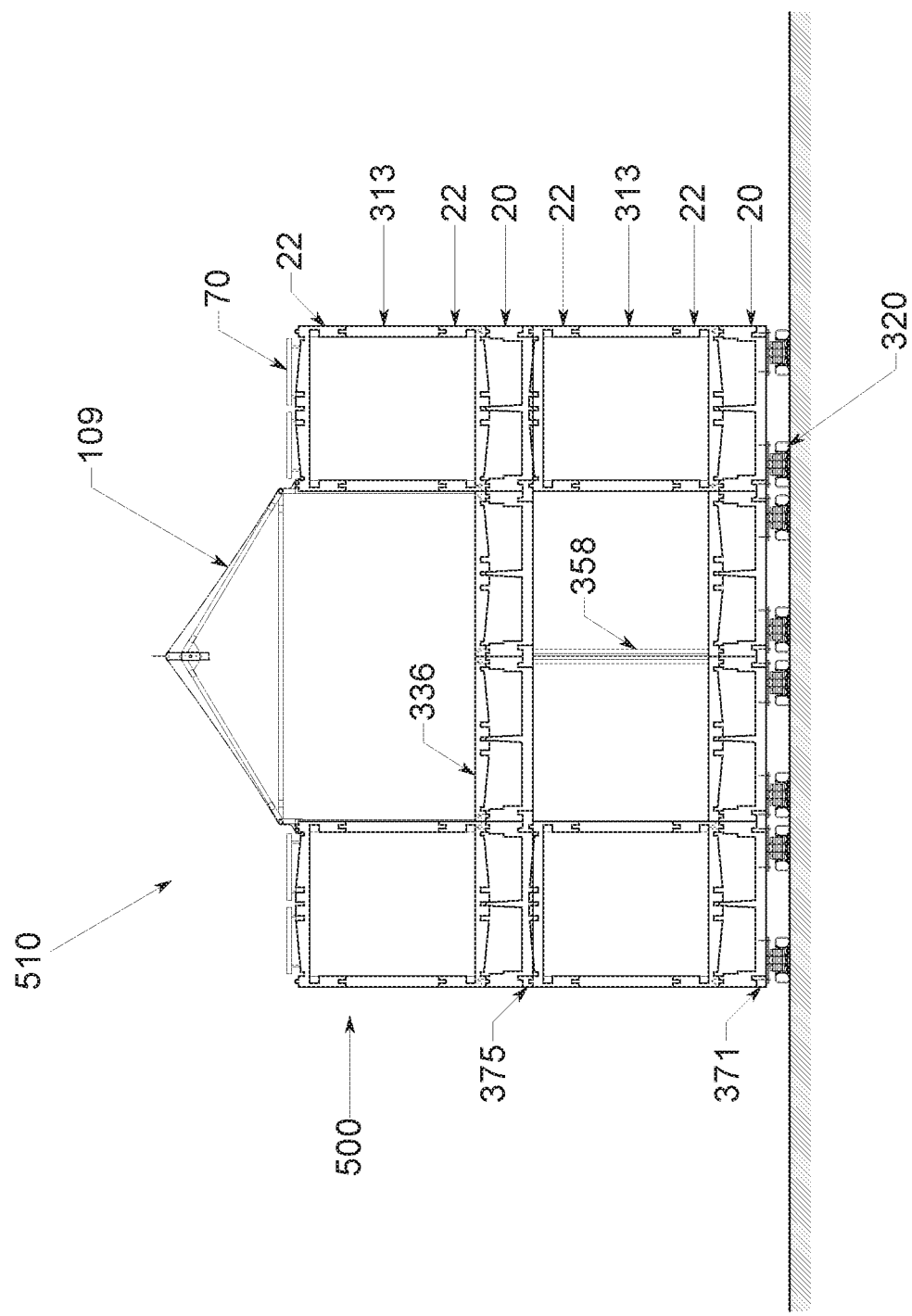
FIG. 36 is a sectional view through the two-story LMU assembly showing the stacking nature of all the components necessary to connect a two-story system, according to an embodiment of the present invention.

FIG. 36 is a sectional view through the two-story LMU assembly 510 showing the stacking nature of all the components necessary to connect a two-story system, according to an embodiment of the present invention. An interchangeable deck and roof assembly 22, snaps into place atop of the lower hull 20 by means of deck and roof insert 24 (not shown, see FIG. 3) molded into the interchangeable deck and roof 22 being inserted into the hull deck recess 350 (not shown, see FIG. 3). To securely fasten the lower interchangeable deck and roof assembly 22 to the lower hull 20, bolts will be inserted into the bolt cavity 150 (not shown, see FIG. 30) and fastened into the threaded inserts molded into the lower hull 20. End type hull connectors 371 are also inserted into the lower hulls 20 without other adjacent LMU's 500 and exposed to air. A lower interchangeable sill 23 (not shown, see FIG. 13) with the sill insert 25 (not shown, see FIG. 13) is placed into a bulkhead insert recess 341 (not shown, see FIG. 15). To securely fasten the lower interchangeable sill 23 to the lower hull 20, stainless steel bolt, washer and nut assembly 301 (not shown, see FIG. 4) will be inserted into the bolt cavity 150 (not shown, see FIG. 30) and fastened into the threaded bolt hole inserts 33 (not shown, see FIG. 30) molded into the lower hull 20. An upper interchangeable deck and roof assembly 22 is rotated 180 degrees from the lower interchangeable deck and roof assembly 22 of the LMU 500 and placed on top of the upper interchangeable sill 23 (not shown, see FIG. 30) and four columns 313 acting as a roof. The upper and lower column inserts 314 (not shown, see FIG. 11) lock into the column insert recess 342 (not shown, see FIG. 10) of the interchangeable deck and roof assembly 22. The upper column inserts 314 (not shown, see FIG. 11) and upper sill inserts 25 (not shown, see FIG. 13) snap into the column insert recess 342 (not shown, see FIG. 10) and bulkhead insert recess 341 (not shown, see FIG. 10).

The lower and upper portions of the LMU 500 are further secured to one another by means of a metal vertical connector bar and bolting assembly 28 that provides a bolted connection to the threaded bolt hole inserts 33 molded into the lower interchangeable deck and roof assembly 22, columns 313, and upper interchangeable deck and roof assembly 22. A joint type roof stack connector 374 (not shown, see FIG. 38) and end type roof stack connector 375 are used to bind the lower and upper levels of the two-story LMU assembly 510 and the assembly of the second level conforms to the same sequencing as outlined for level one. An upper level open space is covered by a waterproof tensile fabric canopy 109. An exterior balcony along the perimeter edge of the tensile fabric canopy 109 is comprised of a flat deck 336 attached to the top side of a lower hull 20 as previously cited. Elevated exterior decks used for balconies and/or stair landings will incorporate a structural post column 358 at each corner not attached or directly adjacent to an LMU 500 to provide additional support to accommodate loading. A stainless steel bolt assembly will be used to attach the post column 358 to the lower hull 20. If required, an integrated photovoltaic panel 70 system will be attached above the second level of the upper interchangeable deck and roof assembly 22. The two-story LMU assembly 510 utilizes a land wheel base isolation system 320 to transfer loads from the overall assembly to the ground.

Figure 37:
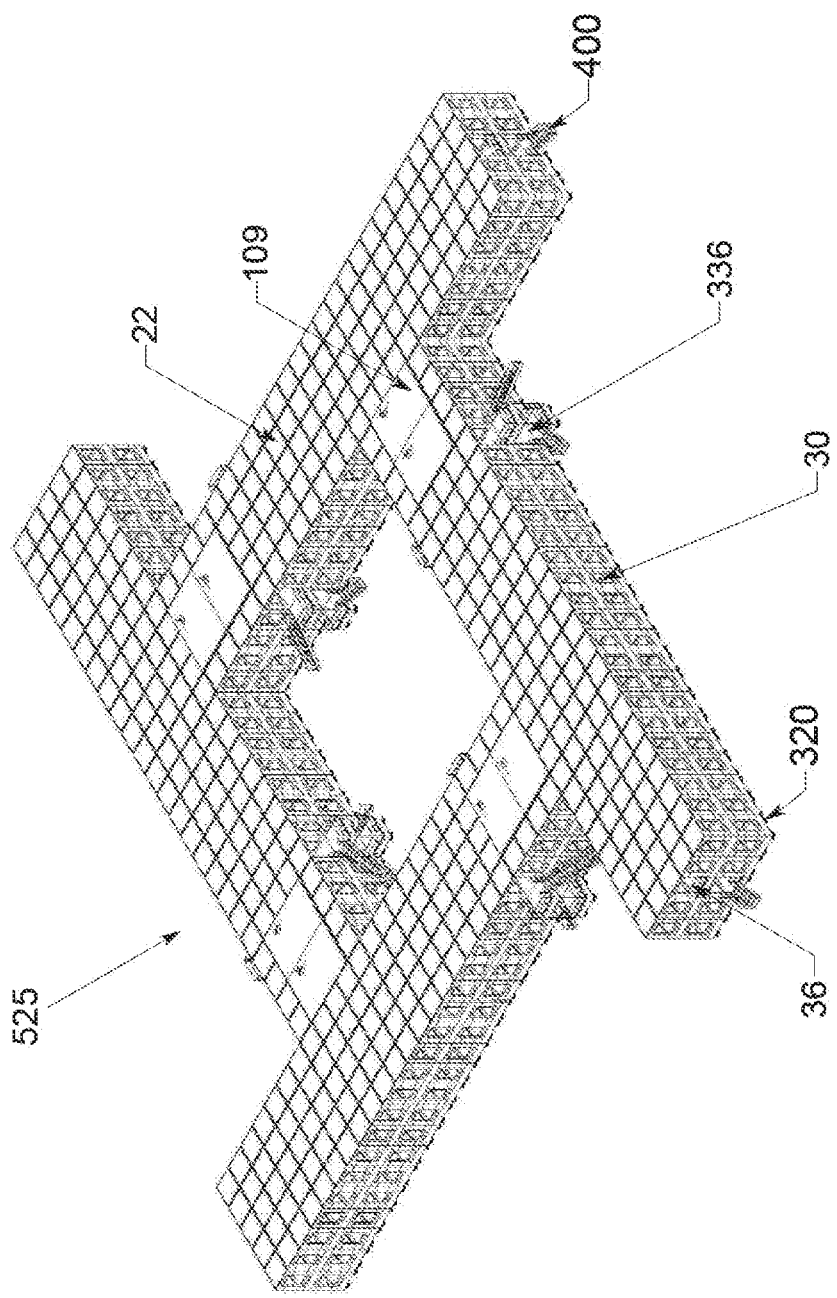
FIG. 37 is a perspective view showing an example of a masterplan two-story LMU community configuration, according to an embodiment of the present invention.

FIG. 37 is a perspective view showing an example of a masterplan two-story LMU community 525 configuration, according to an embodiment of the present invention. The two-story LMU assembly 510 can be removably connected to other two-story LMU assembly 510 or to waterproof tensile fabric canopies 109. Users have access to the first level LMU 500 and to the second level LMU 500 using a stair assembly 400. Each lower level LMU 500 of the shown two-story LMU community 525 will rest on top of a land wheel base isolation system 320 that connect the project to the terrain.

Figure 38:
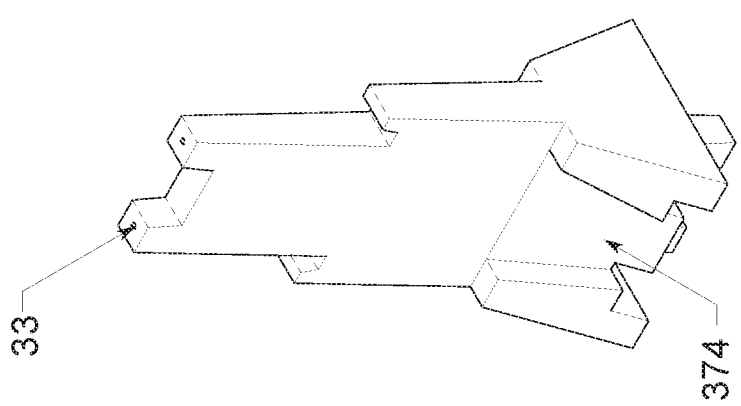
FIG. 38 is a perspective view of a joint type roof stack connector, according to an embodiment of the present invention.

FIG. 38 is a perspective view of a joint type roof stack connector 374, according to an embodiment of the present invention, fabricated from rotational molded high density polyethylene resin with molded air cavity intended to be plugged into the hull connector recess 345 (not shown, see FIG. 30) of the lower hull 20 and serve as a connector between the roof of the first level and floor of the second level. The tapered inclined edges conform to the negative space cavity of the hull connector recess 345 (not shown, see FIG. 30) and provide an interlocking mechanism that helps bind the lower hulls 20 (not shown, see FIG. 30) and interchangeable deck and roof assembly 22 (not shown, see FIG. 30) to each other. Once in place, the joint type roof stack connector 374 can be more securely fastened to these components by means of a stainless steel bolt, washer and nut assembly 301 (not shown, see FIG. 4) being inserted into the corresponding threaded bolt hole inserts 33 of both the joint type hull connector 32 (not shown, see FIG. 4) and lower hull 20 (not shown, see FIG. 30).

Figure 39:
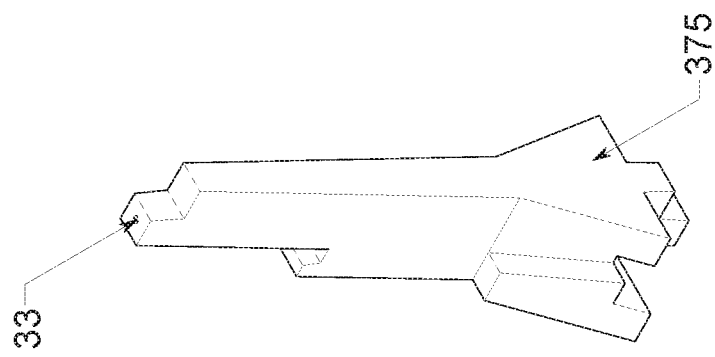
FIG. 39 is a perspective view of an end type roof stack connector, according to an embodiment of the present invention.

FIG. 39 is a perspective view of an end type roof stack connector 375, according to an embodiment of the present invention, fabricated from rotational molded high density polyethylene resin with molded air cavity intended to be plugged into the hull connector recess 345 (not shown, see FIG. 30) of the lower hull 20 and serve as a connector between the roof of the first level and floor of the second level. The tapered inclined edges conform to the negative space cavity of the hull connector recess 345 (not shown, see FIG. 30) and provide an interlocking mechanism that helps bind the lower hulls 20 (not shown, see FIG. 30) and interchangeable deck and roof assembly 22 and flat deck 336 to each other as illustrated in FIG. 31. Once in place, the end type roof stack connector 375 can be more securely fastened to these components by means of a stainless steel bolt, washer and nut assembly 301 (not shown, see FIG. 4) being inserted into the corresponding threaded bolt hole inserts 33 of both the end type roof stack connector 375 and lower hull 20, interchangeable deck and roof assembly 22 as illustrated in FIG. 31.

Figure 40:
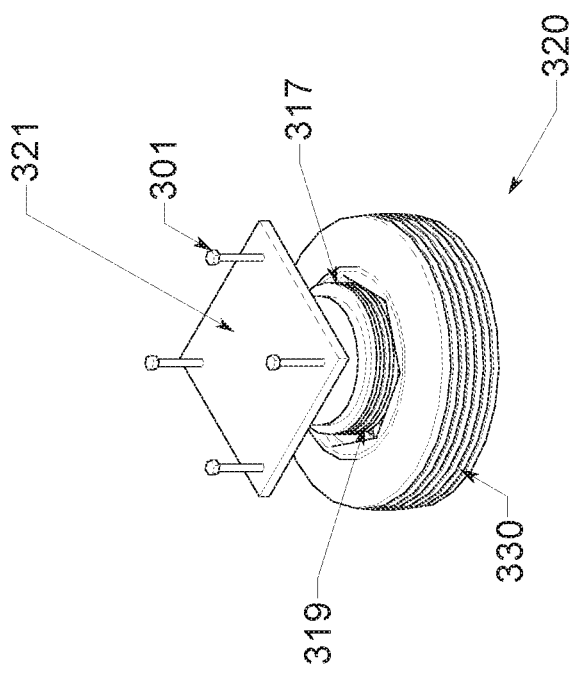
FIG. 40 is a perspective view of a fully assembled, land wheel base isolation system suitable for a plurality of uses, according to an embodiment of the present invention.

FIG. 40 is a perspective view of a fully assembled, land wheel base isolation system 320, according to an embodiment of the present invention. The land wheel base isolation system 320, is ready to be attached to the underside of the corner of an LMU 500 (not shown, see FIG. 30). A vehicle tire 330 is attached to a 300 millimeter diameter brake rotor 317 and rubber layers 319 and steel shim plates 318 (not shown, see FIG. 41) are attached to the underside of a predrilled steel plate 321 with four stainless steel bolt, washer and nut assembly 301 that are used to attach to the underside of a lower hull 20 (not shown, see FIG. 30).

Figure 41:
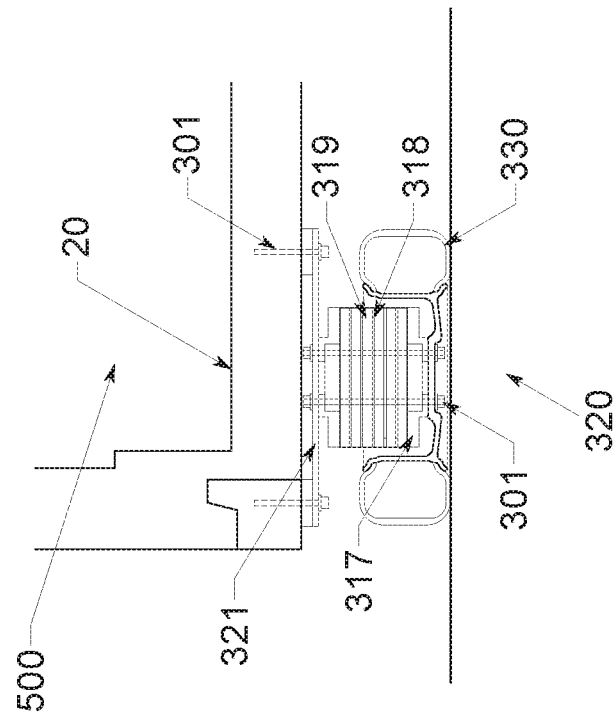
FIG. 41 is a sectional view through a fully assembled, land wheel base isolation system attached to the underside of the corner of an LMU, according to an embodiment of the present invention.

FIG. 41 is a sectional view through a fully assembled, land wheel base isolation system 320 attached to the underside of the corner of an LMU 500, according to an embodiment of the present invention. A vehicle tire 330 attaches to a 300 millimeter brake rotor 317 and rubber layers 319 and steel shim plates 318 are attached to the underside of a predrilled steel plate 321 with four stainless steel bolts, washers and nuts assembly 301 inserted into the threaded bolt hole inserts 33 located along the underside of a lower hull 20.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

What is claimed is:

1. A transportable structure kit for use in assembling at least one level of communities for land or water comprising:
a top portion, a deck assembly and a bottom portion, wherein the top portion, the deck assembly and the bottom portion together form a single story, wherein a top surface of the bottom portion engages with a bottom surface of the deck assembly, and a top surface of the deck assembly engages with a bottom surface of the top portion in an enclosed, compact transportation mode configuration;
a plurality of panel sections and a plurality of column members storable within the enclosed, compact transportation mode configuration; and
in a shelter mode configuration of the single story, the top surface of the bottom portion engages with a bottom surface of the deck assembly;
the plurality of column members adjoins the deck assembly with the top portion to form the shelter mode configuration of the single story; and
the plurality of panel sections and the plurality of column members assembles into the shelter mode configuration of the single story; and
wherein the top portion and the deck assembly are interchangeable with one another in the shelter mode configuration by rotating each by 180 degrees, such that the rotated top portion substitutes for use as the deck assembly and the rotated deck assembly substitutes for use as the top portion.

2. The transportable structure kit of claim 1, further comprising a base removably attached to a bottom surface of the shelter mode configuration.

3. The transportable structure kit of claim 1, wherein the base comprises:
a body surrounding a middle piece;
the middle piece stacked between the body and a bottom surface of a plate; and
a plurality of supporting members attached to a top surface of the plate.

4. The transportable structure kit of claim 3, wherein the body is a vehicle tire.

5. The transportable structure kit of claim 3, wherein the middle piece is a brake rotor.

6. The transportable structure kit of claim 3, wherein the plurality of supporting members are bolts.

7. The transportable structure kit of claim 1, further comprising a second shelter mode configuration removably stacked on a top surface of a top portion of a first shelter mode configuration.

8. The transportable structure kit of claim 7, wherein the top portion of the first shelter mode configuration is connected to a bottom portion of the second shelter mode configuration by a stack connector.

9. The transportable structure kit of claim 1, wherein an adjacent shelter mode configuration is removably connected by a hull connector.

10. The transportable structure kit of claim 1, wherein the bottom portion is made from rotational molded high density polyethylene resin with a molded air cavity and injected high density polyurethane foam.

11. The transportable structure kit of claim 1, wherein the shelter mode configuration is a bathroom.

12. The transportable structure kit of claim 1, wherein the shelter mode configuration is a kitchen.

13. A transportable structure kit for use in assembling at least one level of communities for land or water comprising:
a top portion;
a deck assembly;
a bottom portion, wherein the top portion, the deck assembly and the bottom portion together form a single story;
a plurality of column members, each column member is connected at a first end to a top surface of the deck assembly and at a second end to a bottom surface of the top portion to support a shelter mode configuration of the single story;
at least four panels, each panel connected to the top portion and deck assembly to form an enclosed shelter mode configuration of the single story;
a plurality of connecting means, each connecting means adjoining an adjacent shelter mode configuration; and
a base removably engaged with a bottom surface of the bottom portion;
wherein the top portion and the deck assembly are interchangeable with one another in the shelter mode configuration by rotating each by 180 degrees, such that the rotated top portion substitutes for use as the deck assembly and the rotated deck assembly substitutes for use as the top portion.

14. A method of assembling a shelter structure community for land or water comprising at least a shelter mode configuration from a transportable structure kit that forms a single story, the kit comprising: a top portion, a deck assembly, a bottom portion, a plurality of column members, and a plurality of panels, each of which together form the single story; the method comprising:
connecting a bottom surface of the deck assembly to a top surface of the bottom portion; and
connecting at least one end of a column member to a top surface of the deck assembly and at the other end to a bottom surface of a top portion;
wherein the top portion and the deck assembly are interchangeable with one another in the shelter mode configuration by rotating each by 180 degrees such that the rotated top portion substitutes for use as the deck assembly and the rotated deck assembly substitutes for use as the top portion.

15. The method of claim 14, further comprising connecting at least one base to a bottom surface of the bottom portion.

16. The method of claim 15, further comprising connecting a second shelter mode configuration to a top surface of a top portion of a first shelter mode configuration using a connecting means.

17. The method of claim 15, further comprising connecting the shelter mode configuration to an adjacent shelter mode configuration using a hull connector.

18. The method of claim 14, further comprising connecting the shelter mode configuration to the earth by an anchor assembly.

19. The method of claim 14, further comprising connecting the shelter mode configuration to an adjacent shelter mode configuration using a hull connector.

20. The method of claim 14 further comprising connecting the shelter mode configuration to a canopy.

* * * * *